(12) United States Patent
Inuzuka et al.

(10) Patent No.: US 11,165,497 B2
(45) Date of Patent: Nov. 2, 2021

(54) OPTICAL TRANSMISSION SYSTEM AND COMMUNICATION CONDITION SELECTION METHOD

(71) Applicant: NIPPON TELEGRAPH AND TELEPHONE CORPORATION, Tokyo (JP)

(72) Inventors: Fumikazu Inuzuka, Musashino (JP); Shokei Kobayashi, Musashino (JP); Akira Hirano, Musashino (JP); Wataru Kawakami, Musashino (JP); Tetsuro Inui, Musashino (JP); Seiki Kuwabara, Musashino (JP); Kei Kitamura, Musashino (JP); Takafumi Tanaka, Musashino (JP); Takuya Oda, Musashino (JP); Hideki Nishizawa, Musashino (JP); Seiji Okamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/979,662

(22) PCT Filed: Mar. 1, 2019

(86) PCT No.: PCT/JP2019/008101
§ 371 (c)(1),
(2) Date: Sep. 10, 2020

(87) PCT Pub. No.: WO2019/176587
PCT Pub. Date: Sep. 19, 2019

(65) Prior Publication Data
US 2021/0028857 A1 Jan. 28, 2021

(30) Foreign Application Priority Data
Mar. 14, 2018 (JP) .............................. JP2018-047277

(51) Int. Cl.
*H04J 14/00* (2006.01)
*H04B 10/079* (2013.01)
(Continued)

(52) U.S. Cl.
CPC ......... *H04B 10/079* (2013.01); *H04B 10/077* (2013.01); *H04B 10/25* (2013.01);
(Continued)

(58) Field of Classification Search
CPC .... H04B 10/079; H04B 10/272; H04B 10/25; H04B 10/077; H04B 10/5161;
(Continued)

(56) References Cited

U.S. PATENT DOCUMENTS 8,315,527 B2 * 11/2012 Kimura .............. H04Q 11/0067
398/168
8,331,402 B2 * 12/2012 Sakai .................... H04J 3/1658
370/474

(Continued)

FOREIGN PATENT DOCUMENTS

| JP | 2012105180 A | 5/2012 |
| JP | 2014120788 A | 6/2014 |
| JP | 20165193 A | 1/2016 |

OTHER PUBLICATIONS

Jaikaeo, Information Sources and Signals, 2009, Computer Engineering Department, Kasetsart University, All Document. https://slidetodoc.com/information-sources-and-signals-asst-prof-chaiporn-jaikaeo/ (Year: 2009).*

(Continued)

*Primary Examiner* — Dibson J Sanchez
(74) *Attorney, Agent, or Firm* — Harness, Dickey & Pierce, P.L.C.

(57) ABSTRACT

There is provided an optical transmission system in which a plurality of optical transmission and reception apparatuses
(Continued)

perform 1-to-N transmission and reception of optical signals (N is an integer equal to or greater than 1), the optical transmission system being configured to select a communication condition that includes at least a modulation scheme or a baud rate and is a communication condition when each of the optical transmission and reception apparatuses performs transmission and reception in accordance with a transmission line condition that is between any one first optical transmission and reception apparatus and each of second optical transmission and reception apparatuses, which are N grounds, other than the first optical transmission and reception apparatus.

6 Claims, 23 Drawing Sheets

(51) Int. Cl.
| | | |
|---|---|---|
| | *H04B 10/077* | (2013.01) |
| | *H04B 10/25* | (2013.01) |
| | *H04B 10/272* | (2013.01) |
| | *H04B 10/516* | (2013.01) |
| | *H04Q 11/00* | (2006.01) |
| | *H04J 14/02* | (2006.01) |

(52) U.S. Cl.
CPC ....... *H04B 10/272* (2013.01); *H04B 10/5161* (2013.01); *H04J 14/00* (2013.01); *H04J 14/0227* (2013.01); *H04Q 11/0067* (2013.01); *H04Q 2011/0064* (2013.01)

(58) Field of Classification Search
CPC ........ H04J 14/00; H04J 14/0227; H04J 11/00; H04Q 2011/0064; H04Q 11/0067
USPC .................................................. 398/43–103
See application file for complete search history.

(56) References Cited

U.S. PATENT DOCUMENTS

| | | | | |
|---|---|---|---|---|
| 2004/0196869 | A1* | 10/2004 | Tsuchida | H04L 12/44 370/468 |
| 2010/0067913 | A1* | 3/2010 | Niibe | H04Q 11/0067 398/98 |
| 2011/0217041 | A1* | 9/2011 | Yoshida | H04L 47/10 398/58 |
| 2012/0163809 | A1* | 6/2012 | Sugawa | H04B 10/272 398/34 |
| 2014/0294388 | A1* | 10/2014 | Odaka | H04J 3/1694 398/66 |
| 2018/0332373 | A1* | 11/2018 | Wey | H04Q 11/0062 |
| 2018/0343065 | A1* | 11/2018 | Li | H04B 10/27 |

OTHER PUBLICATIONS

Vacondio et al, Flexible TDMA access optical networks enabled by burst mode, Oct. 2013, ECOC, All Document. (Year: 2013).*

J.R. Stern, et al. "Passive Optical Local Networks for Telephony Applications and Beyond." Electronics Letters, vol. 23, No. 24, 1987, pp. 1255-1256.

* cited by examiner

| MODULATION SCHEME | BAUD RATE | REFERENCE INFORMATION |
|---|---|---|
| 8QAM | 100Gbaud | REFERENCE INFORMATION A |
| 16QAM | 50Gbaud | REFERENCE INFORMATION B |
| 64QAM | 32Gbaud | REFERENCE INFORMATION C |
| ⋮ | ⋮ | ⋮ |

| APPARATUS IDENTIFICATION INFORMATION | REGISTRATION ID | MODULATION SCHEME | BAUD RATE | SLOT LENGTH | TRANSMISSION TIMING |
|---|---|---|---|---|---|
| (ID OF OPTICAL TRANSMISSION AND RECEPTION APPARATUS 20b-1) | 1 | 64QAM | 32Gbaud | 30 | 00:00:10:00 |
| (ID OF OPTICAL TRANSMISSION AND RECEPTION APPARATUS 20b-2) | 2 | 16QAM | 50Gbaud | 40 | 00:00:30:00 |
| ⋮ | ⋮ | ⋮ | ⋮ | ⋮ | ⋮ |

OPTICAL TRANSMISSION SYSTEM AND COMMUNICATION CONDITION SELECTION METHOD

CROSS-REFERENCE TO RELATED APPLICATIONS

This application is a 371 U.S. National Phase of International Application No. PCT/JP2019/008101, filed on Mar. 1, 2019, which claims priority to Japanese Application No. 2018-047277 filed on Mar. 14, 2018. The entire disclosures of the above applications are incorporated herein by reference.

TECHNICAL FIELD

The present disclosure relates to an optical transmission system and a communication condition selection method.

BACKGROUND ART

An example of a configuration of an optical transmission system which performs 1-to-N transmission and reception of optical signals includes an optical transmission system 900 as illustrated in FIG. 23, for example. In the optical transmission system 900, by providing a light splitter 950, there is no need to directly connect, with individual optical fibers, an optical transmission and reception apparatus 910 and each of optical transmission and reception apparatuses 920-1 to 920-N being N number of grounds (N is an integer equal to or greater than 1). Thus, by saving on the optical fibers used in the construction of an optical transmission line, it is possible to construct an economical optical transmission system (for example, see Non-Patent Literature 1).

CITATION LIST

Non Patent Literature

Non-Patent Literature 1: J. R. Stern, et. al., "PASSIVE OPTICAL LOCAL NETWORKS FOR TELEPHONY APPLICATIONS AND BEYOND", ELECTRONICS LETTERS, vol. 23, no. 24 pp. 1255 to 1256, November 1987

SUMMARY OF THE INVENTION

Technical Problem

Meanwhile, in the configuration in which passive optical elements such as the light splitter 950 are used, a part of the transmission line is shared by a plurality of optical signals having different grounds. For example, in the configuration of the optical transmission system 900 described above, an optical fiber 990 between the optical transmission and reception apparatus 910 and the light splitter 950 is connected to the light splitter 950 and an optical transponder provided in the optical transmission and reception apparatus 910. Thus, the optical fiber 990 is shared during transmission and reception of optical signals between the optical transmission and reception apparatus 910 and each of the optical transmission and reception apparatuses 920-1 to 920-N.

In this case, the optical transmission and reception apparatus 910 needs to transmit and receive optical signals in accordance with a receivable communication quality at a point where transmission line conditions are the most strict. For example, in FIG. 23, it is assumed that a transmission distance between the optical transmission and reception apparatus 910 and the optical transmission and reception apparatus 920-1 is the longest, that is, the optical transmission and reception apparatus 920-1 is located the farthest. In a case where a length of the transmission distance is set as a transmission line condition, the optical transmission and reception apparatus 910 needs to limit a communication condition, such as a communication capacity, so that the optical transmission and reception apparatus 920-1 is receivable at the transmission distance to the optical transmission and reception apparatus 920-1 located the farthest.

In this case, the optical transmission and reception apparatus 910 transmits and receives the optical signals at the limited communication condition to and from the optical transmission and reception apparatuses 920-2 to 920-N other than the optical transmission and reception apparatus 920-1. Thus, there is a problem in that the overall communication quality of the optical transmission system 900 is limited to the communication quality in the ground having the strictest transmission line condition.

In view of the above problem, an object of the present disclosure is to provide a technology capable of selecting an appropriate communication condition for each around in accordance with a transmission line condition for each ground, in an optical transmission system which performs 1-to-N transmission and reception of optical signals s an integer equal to or greater than 1).

Means for Solving the Problem

According to one aspect of the present disclosure, there is provided an optical transmission system in which a plurality of optical transmission and reception apparatuses perform 1-to-N transmission and reception of optical signals (N is an integer equal to or greater than 1), the optical transmission system being configured to select a communication condition that includes at least a modulation scheme or a baud rate and is a communication condition when each of the optical transmission and reception apparatuses performs transmission and reception in accordance with a transmission line condition, the transmission line condition being between any one first optical transmission and reception apparatus and each of second optical transmission and reception apparatuses, which are N grounds, other than the first optical transmission and reception apparatus.

The optical transmission system according to one aspect of the present disclosure, including: an optical passive element configured to branch an optical signal transmitted by the first optical transmission and reception apparatus and transmit the optical signals to each of the second optical transmission and reception apparatuses in a case where the first optical transmission and reception apparatus is on a transmission side, and configured to combine optical signals transmitted by the second optical transmission and reception apparatuses and transmit the optical signal to the first optical transmission and reception apparatus in a case where the first optical transmission and reception apparatus is on a reception side.

In the optical transmission system according to one aspect of the present disclosure, the first optical transmission and reception apparatus includes a transmission line condition detection unit configured to detect the transmission line condition that is with each of the second optical transmission and reception apparatuses, a communication condition selection unit configured to select any one of communication conditions associated with each of the transmission line conditions in advance based on the transmission line condition detected by the transmission line condition detection unit, and a communication condition setting unit configured to set the communication condition of an own apparatus and the communication condition, which is to be detected by the transmission line condition detection unit, of the second optical transmission and reception apparatus to the communication condition to be selected by the communication condition selection unit.

In the optical transmission system according to one aspect of the present disclosure, the first optical transmission and reception apparatus includes a reference signal generation unit configured to generate a plurality of reference signals corresponding to each of candidates of the communication condition by performing modulation based on each of the candidates of the communication condition enabling an own apparatus to perform transmission and reception, a reference signal transmission unit configured to transmit the plurality of reference signals generated by the reference signal generation unit and information of the communication conditions corresponding to the plurality of reference signals to each of the second optical transmission and reception apparatuses, and a communication condition selection unit configured to select, based on information related to the reference signal successfully demodulated by each of the second optical transmission and reception apparatuses, the communication condition when transmission and reception with each of the second optical transmission and reception apparatuses is performed, the second optical transmission and reception apparatus includes a reference signal detection unit configured to receive the plurality of reference signals and the information of the communication conditions corresponding to the plurality of reference signals transmitted by the first optical transmission and reception apparatus, demodulate, based on the communication conditions corresponding to the plurality of reference signals, the plurality of reference signals received, and detect the reference signal successfully demodulated, and a registration processing unit configured to transmit a registration request signal including information related to the reference signal detected by the reference signal detection unit to the first optical transmission and reception apparatus, and the first optical transmission and reception apparatus and the second optical transmission and reception apparatus transmit and receive the optical signal in accordance with the communication condition selected by the communication condition selection unit.

In the optical transmission system according to one aspect of the present disclosure, in a case where the communication condition includes the modulation scheme and the baud rate, when transmitting each of the plurality of reference signals, the reference signal transmission unit transmits the plurality of reference signals by rearranging the plurality of reference signals so that the reference signals having the same modulation scheme are continuous, the reference signals having the same baud rate are continuous, or the reference signals having a same length of the reference signal are continuous, or by adding a payload signal having a length in accordance with a length of each of the plurality of reference signals generated by the reference signal generation unit.

In the optical transmission system according to one aspect of the present disclosure, when generating the plurality of reference signals, the reference signal generation unit generates the reference signals so that each of the reference signals has the same length.

In the optical transmission system according to tone aspect of the present disclosure, a guard time signal having a signal length in accordance with a length of a time required to change the communication condition is inserted before and after each of the plurality of reference signals.

According to one aspect of the present disclosure, there is provided a communication condition selection method when a plurality of optical transmission and reception apparatuses perform 1-to-N transmission and reception of optical signals (N is an integer equal to or greater than 1), the communication condition selection method comprising: selecting a communication condition that includes at least a modulation scheme or a baud rate and is a communication condition when each of the optical transmission and reception apparatuses performs transmission and reception in accordance with a transmission line condition, the transmission line condition being between any one first optical transmission and reception apparatus and each of second optical transmission and reception apparatuses, which are N grounds, other than the first optical transmission and reception apparatus.

Effects of the Invention

According to the present disclosure, in an optical transmission system which performs 1-to-N transmission and reception of optical signals, an appropriate communication condition can be selected for each ground in accordance with a transmission line condition for each ground.

BRIEF DESCRIPTION OF DRAWINGS

FIG. 8 is a diagram illustrating a data configuration of a reference information table according to the same embodiment.

FIG. 9 is a diagram illustrating a data configuration of a registration information table according to the same embodiment.

DESCRIPTION OF EMBODIMENTS

First Embodiment

Figure 1:
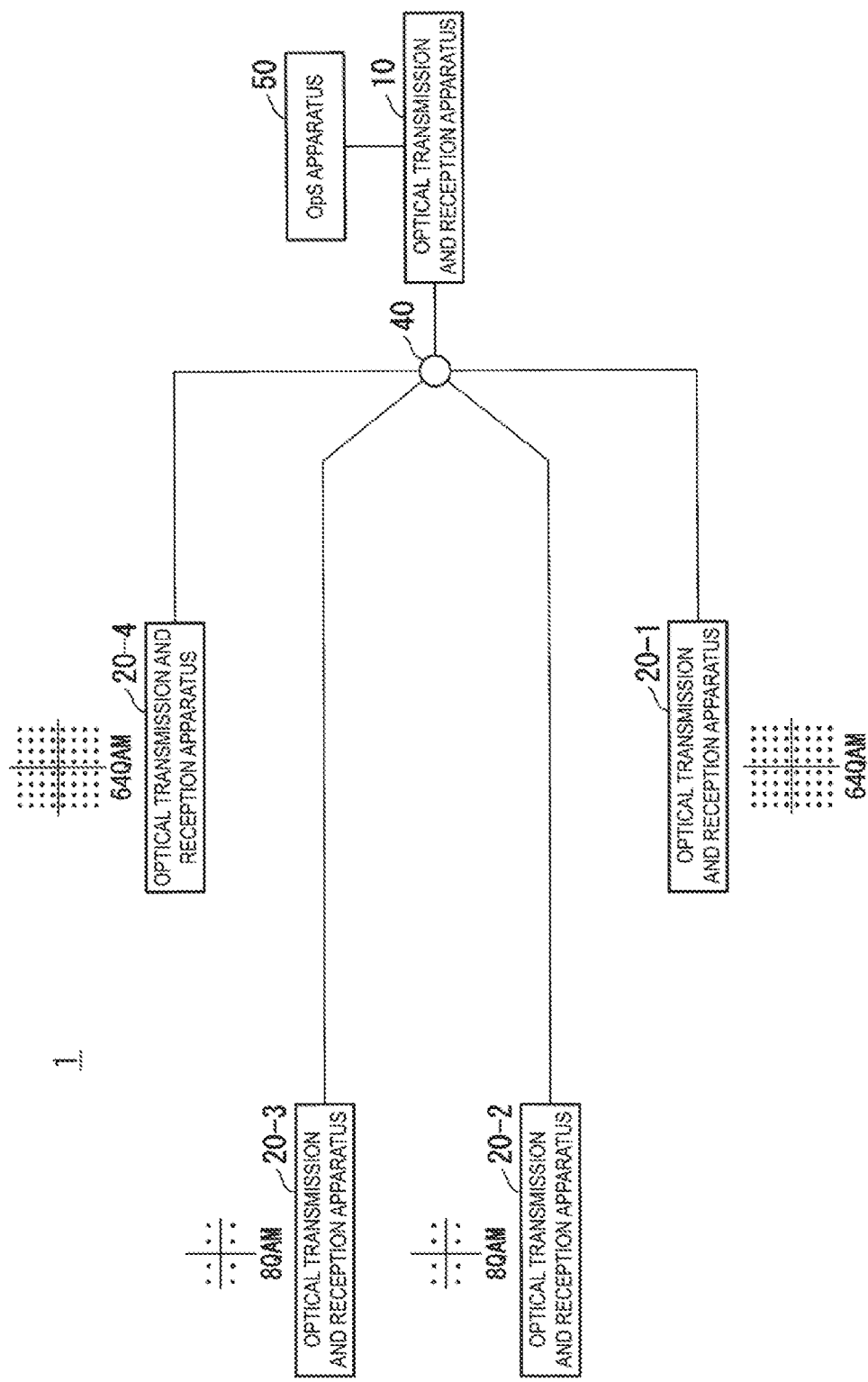
FIG. 1 is a block diagram illustrating a configuration of an optical transmission system according to a first embodiment.

Hereinafter, embodiments of the present disclosure will be described with reference to the drawings. FIG. 1 is a block diagram illustrating a configuration of an optical transmission system 1 of a first embodiment. The optical transmission system 1 is, for example, a Passive Optical Network (PON) type optical transmission system, and includes an optical transmission and reception apparatus 10, optical transmission and reception apparatuses 20-1 to 20-4, an optical multiplexer-demultiplexer 40, and an OpS apparatus 50. The optical transmission and reception apparatus 10 and the optical transmission and reception apparatuses 20-1 to 20-4 transmit and receive digital coherent optical signals through optical fibers respectively connected to the apparatuses.

The optical multiplexer-demultiplexer 40 is, for example, an optical passive element such as a light splitter, an optical coupler, or an optical multiplexer, and branches an optical signal transmitted by the optical transmission and reception apparatus 10, and transmits the optical signal to the optical transmission and reception apparatuses 20-1 to 20-4. The optical multiplexer-demultiplexer 40 combines optical signals transmitted by the optical transmission and reception apparatuses 20-1 to 20-4, and transmits the optical signal to the optical transmission and reception apparatus 10. That is, the optical transmission system 1 performs 1-to-4 transmission and reception of optical signals with the optical transmission and reception apparatuses 20-1 to 20-4 as four grounds.

The OpS apparatus 50 is an operation system, for example, in response to an operation by an operator of the optical transmission system 1, sets a communication condition according to a transmission line condition for the optical transmission and reception apparatus 10, The OpS apparatus 50 receives the operation by the operator of the optical transmission system 1 to set communication conditions in accordance with transmission line conditions to the optical transmission and reception apparatuses 20-1 to 20-4 via the optical transmission and reception apparatus 10. For example, the communication condition is set for a Digital Signal Processor (DSP), which performs a modulation process or a demodulation process, provided in the optical transmission and reception apparatuses 10 and 20-1 to 20-4.

Here, the transmission line condition is, for example, a length of a transmission distance between the optical transmission and reception apparatus 10 and each of the optical transmission and reception apparatuses 20-1 to 20-4, a transmission and reception power or an Optical Signal to Noise Ratio (OSNR) which increases or decreases in accordance with the length of the transmission distance, or the like.

The communication condition is a condition such as a modulation scheme, a baud rate, or the like which changes a communication quality, such as a communication capacity. As the modulation scheme, polarization multiplexing Quadrature Phase Shift Keying (QSPK) or quadrature amplitude modulation realized by using a digital coherent optical signal is applied. In the following, in one example, a description is given assuming that any one of 8 QAM, 16 QAM, and 64 QAM having different multi-levels in Quadrature Amplitude Modulation (QAM) is applied.

In the optical transmission system 1, regarding transmission distances between the optical transmission and reception apparatus 10 and the optical transmission and reception apparatuses 20-1 to 20-4, it is assumed that a transmission distance to each of the optical transmission and reception apparatuses 20-2 and 20-3 is longer than a transmission distance to each of the optical transmission and reception apparatuses 20-1 and 20-4. In this case, an OSNR in each of the optical transmission and reception apparatuses 20-1 and 20-4 is higher than an OSNR of each of the optical transmission and reception apparatuses 20-2 and 20-3.

Thus, even when a communication condition of a modulation scheme having a large multi-level such as 64 QAM, for example, is applied to the optical transmission and reception apparatuses 20-1 and 20-4 having the high OSNRs, it is expected that optical signals can be transmitted and received without bit errors or the like. In contrast, in a case where the communication condition of the modulation scheme having a large multi-level such as 64 QAM is applied to the optical transmission and reception apparatuses 20-2 and 20-3 having the low OSNRs, it is expected that bit errors or the like may occur and the optical signals cannot be stably transmitted and received.

Thus, an operator of the optical transmission system 1 operates the OpS apparatus 50 to set information setting, for example, 64 QAM having high multi-levels as a modulation scheme to be applied to transmission and reception of optical signals to the optical transmission and reception apparatus 20-1 and the optical transmission and reception apparatus 20-4. In addition, the operator of the optical transmission system 1 operates the OpS apparatus 50 to set information setting 64 QAM as the modulation scheme to be applied to transmission and reception of optical signals between the optical transmission and reception apparatuses 20-1 and 20-4 to the optical transmission and reception apparatus 10.

In contrast, with respect to the optical transmission and reception apparatus 20-2 and the optical transmission and reception apparatus 20-3, the operator of the optical transmission system 1 operates the OpS apparatus 50 to set information setting, for example, 8 QAM having low multi-levels as the modulation scheme to be applied to transmission and reception of optical signals. In addition, the operator of the optical transmission system 1 operates the OpS apparatus 50 to set information setting 8 QAM as the modulation scheme to be applied to transmission and reception of optical signals between the optical transmission and reception apparatuses 20-2 and 20-3 to the optical transmission and reception apparatus 10.

With this setting as described above, in the optical transmission system 1, by applying 64 QAM having high multi-levels, the optical transmission and reception apparatus 10 and the optical transmission and reception apparatuses 20-1 and 20-4 can efficiently transmit and receive optical signals with a large communication capacity. In contrast, 8 QAM having low multi-levels is applied to the optical transmission and reception apparatus 10 and the optical transmission and reception apparatuses 20-2 and 20-3, so that efficiency of communication is less than 64 QAM, but transmission and reception of optical signals can be stably performed.

In the method of using the OpS apparatus 50 described above, the operator of the optical transmission system 1 operates the OpS apparatus 50 after checking the transmission line condition, and manually sets the modulation scheme to the optical transmission and reception apparatus 10 and the optical transmission and reception apparatuses 20-1 to 20-4. In contrast, by configuring the optical transmission and reception apparatus 10 as illustrated in FIG. 2, it is possible to select an appropriate communication condition in accordance with the transmission line conditions.

Figure 2:
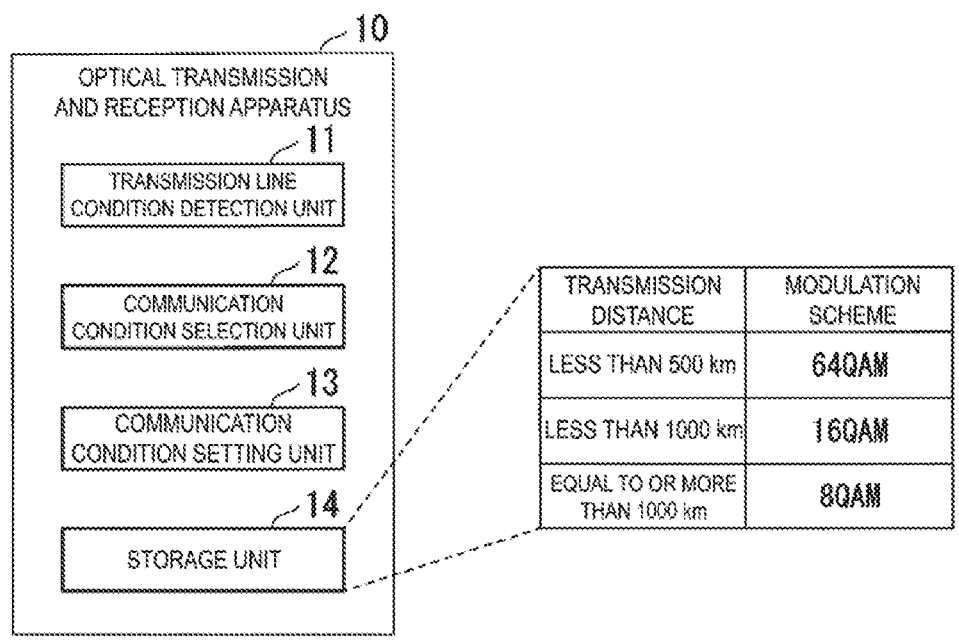
FIG. 2 is a block diagram illustrating a configuration of an optical transmission and reception apparatus according to the same embodiment.

As illustrated in FIG. 2, the optical transmission and reception apparatus 10 includes a transmission line condition detection unit 11, a communication condition selection unit 12, a communication condition setting unit 13, and a storage unit 14. The transmission line condition detection unit 11 detects a transmission line condition between the optical transmission and reception apparatus 10 and each of the optical transmission and reception apparatuses to 20-4. For example, the transmission line condition detection unit 11 includes a calculation apparatus which calculates a transmission distance, a transmission and reception power, or an OSNR, and detects the calculated transmission distance, transmission and reception power, or OSNR as the transmission line condition. The storage unit 14 stores in advance a table in which a transmission line condition and a communication condition corresponding to the transmission line condition are associated with each other, Based on the transmission line condition detected by the transmission line condition detection unit 11, the communication condition selection unit 12 refers to the table stored in the storage unit 14 and selects a communication condition corresponding to the transmission line condition. The communication condition setting unit 13 sets the communication condition, selected by the communication condition selection unit 12, for its own apparatus, and also sets the communication condition selected by the communication condition selection unit 12 for the optical transmission and reception apparatuses 20-1 to 20-4 to be detected by the transmission line condition detection unit 11.

For example, FIG. 2 illustrates an example in which a transmission line condition is set as a transmission distance and a communication condition is set as a modulation scheme. For this reason, for each transmission distance range indicated in an item of "transmission distance", the storage unit 14 stores, in advance, a table indicating "modulation scheme" corresponding to the range. The transmission line condition detection unit 11 detects a transmission distance between the optical transmission and reception apparatus 10 and each of the optical transmission and reception apparatuses 20-1 to 20-4. Based on the transmission distance detected by the transmission line condition detection unit 11, the communication condition selection unit 12 references the table of the storage unit 14, and selects a modulation scheme in accordance with the transmission distance. The communication condition setting unit 13 sets the modulation scheme, selected by the communication condition selection unit 12, for its own apparatus, and also sets the modulation scheme selected by the communication condition selection unit 12 for the optical transmission and reception apparatuses 20-1 to 20-4 to be detected by the transmission line condition detection unit 11.

For example, in FIG. 1, it is assumed that the optical transmission and reception apparatus 20-1 and the optical transmission and reception apparatus 20-4 are located at distances of "less than 500 km" from the optical transmission and reception apparatus 10, and the optical transmission and reception apparatus 20-2 and the optical transmission and reception apparatus 20-3 are located at distances of "equal to or more than 1000 km" from the optical transmission and reception apparatus 10. In this case, the communication condition setting unit 13 of the optical transmission and reception apparatus 10 sets information setting 64 QAM having high multi-levels as a modulation scheme to be applied to transmission and reception of optical signals to the optical transmission and reception apparatus 20-1 and the optical transmission and reception apparatus 20-4. In addition, the communication condition setting unit 13 of the optical transmission and reception apparatus 10 sets information setting 64 QAM as the modulation scheme to be applied to transmission and reception of optical signals between the optical transmission and reception apparatuses 20-1 and 20-4 for its own apparatus.

In addition, the communication condition setting unit 13 of the optical transmission and reception apparatus 10 sets information setting 8 QAM having low multi-levels as a modulation scheme to be applied to transmission and reception of optical signals to the optical transmission and reception apparatus 20-2 and the optical transmission and reception apparatus 20-3. Further, the communication condition setting unit 13 of the optical transmission and reception apparatus 10 sets information setting 8 QAM as the modulation scheme to be applied to transmission and reception of optical signals between the optical transmission and reception apparatuses 20-2 and 20-3 for its own apparatus.

Thus, in the optical transmission system 1, by applying 64 QAM having high multi-levels, the optical transmission and reception apparatus 10 and the optical transmission and reception apparatuses 20-1 and 20-4 can efficiently transmit and receive optical signals with a large communication capacity. In contrast, 8 QAM having low multi-levels is applied to the optical transmission and reception apparatus 10 and the optical transmission and reception apparatuses 20-2 and 20-3, so that efficiency of communication is less than 64 QAM, but transmission and reception of optical signals can be stably performed.

With the configuration of the first embodiment described above, the optical transmission system 1 performs 1-to-4 transmission and reception of optical signals, but the number of grounds is not limited to four, and N optical transmission and reception apparatuses 20-1 to 20-N may be connected to the optical multiplexer-demultiplexer 40 to perform 1-to-N transmission and reception of optical signals. Meanwhile, the minimum configuration may be 1-to-1, so N is an integer equal to or greater than 1.

Further, in the configuration of the first embodiment described above, the appropriate modulation scheme may be selected in accordance with the transmission distance, but as described above, a communication condition other than the modulation scheme, for example, a baud rate may be selected. That is, as a combination of communication conditions, there is a combination in which the baud rate is a fixed value and the modulation scheme is variable, a combination in which the modulation scheme is fixed and the baud rate is a variable value, or a combination in which both of the modulation scheme and the baud rate are variable. As described above, a transmission and reception power, an OSNR, or the like may be applied instead of the transmission distance as the transmission line condition.

According to the configuration of the first embodiment described above, the optical transmission system 1 includes at least three or more optical transmission and reception apparatuses 10 and 20-1 to 20-N and the optical multiplexer-demultiplexer 40, which is an optical passive element connected to the optical transmission and reception apparatuses 10 and 20-1 to 20-N, and performs 1-to-N transmission and reception of optical signals. In the optical transmission system 1, the transmission line condition detection unit 11 of the optical transmission and reception apparatus 10 detects a transmission line condition between the optical transmission and reception apparatus 10 and each of the optical transmission and reception apparatuses 20-1 to 20-N. The communication condition selection unit 12 selects any one of communication conditions associated with each of the transmission line conditions in advance based on the transmission line condition detected by the transmission line condition detection unit 11, The communication condition setting unit 13 sets the communication condition of its own apparatus and the communication conditions of the optical transmission and reception apparatuses 20-1 to 20-N to be detected by the transmission line condition detection unit 11 to communication conditions selected by the communication condition selection unit 12. As a result, in the optical transmission system 1, an appropriate communication condition can be selected for each of the optical transmission and reception apparatuses 20-1 to 20-N in accordance with the transmission line conditions for each of the optical transmission and reception apparatuses 20-1 to 20-N which are grounds.

In the configuration of the first embodiment described above, the optical transmission and reception apparatus 10 includes the transmission line condition detection unit 11, the communication condition selection unit 12, the communication condition setting unit 13, and the storage unit 14, but the configuration of the present disclosure is not limited to the embodiment described above. For example, the OpS apparatus 50 connected to the optical transmission and reception apparatus 10 may include the transmission line condition detection unit 11, the communication condition selection unit 12, the communication condition setting unit 13, and the storage unit 14. In this case, the communication condition setting unit 13 sets the communication condition selected by the communication condition selection unit 12 to the optical transmission and reception apparatus 10 and the optical transmission and reception apparatuses 20-1 to 20-4 to be detected by the transmission line condition detection unit 11.

Figure 3:
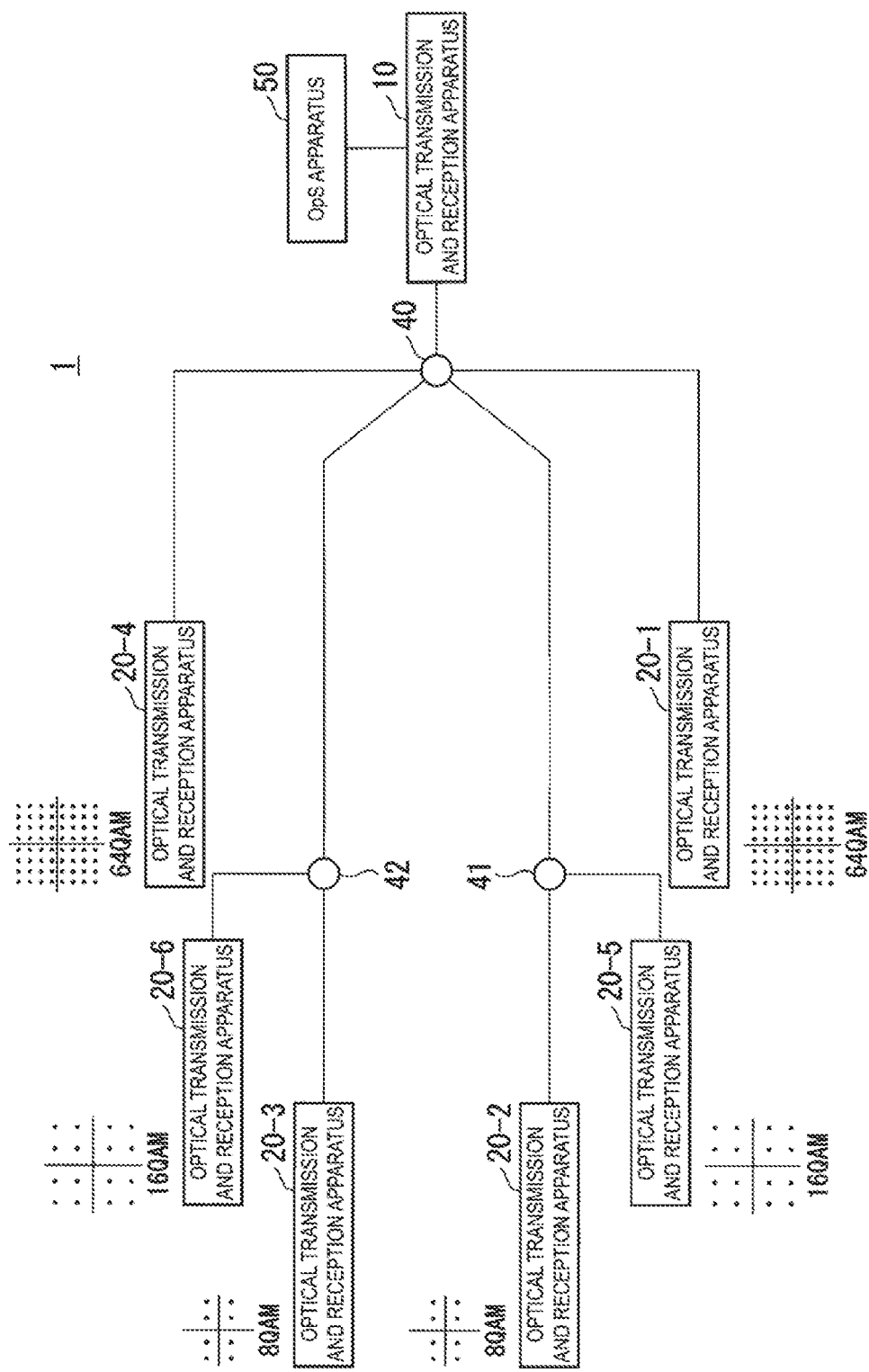
FIG. 3 is a block diagram in a case where the optical transmission and reception apparatus is further connected to the optical transmission system according to the same embodiment.

Instead of connecting all of the optical transmission and reception apparatuses 20-1 to 20-N to the optical multiplexer-demultiplexer 40, optical multiplexer-demultiplexers 41 and 42 may be multi-stage-inserted in the middle of the optical transmission line, for example, as illustrated in FIG. 3. FIG. 3 illustrates an example in which each of optical transmission and reception apparatuses 20-5 and 20-6 is connected to each of the inserted optical multiplexer-demultiplexers 41 and 42. For example, it is assumed that the optical transmission and reception apparatus 20-5 and the optical transmission and reception apparatus 20-6 are located at distances of "equal to or more than 500 km and less than 1000 km" from the optical transmission and reception apparatus 10. In this case, the communication condition setting unit 13 of the optical transmission and reception apparatus 10 sets information setting 16 QAM which is a modulation scheme having multi-levels between modulation schemes 64 and 8 to be applied to transmission and reception of optical signals to the optical transmission and reception apparatus 20-5 and the optical transmission and reception apparatus 20-6. Further, the communication condition setting unit 13 of the optical transmission and reception apparatus 10 sets information setting 16 QAM as the modulation scheme to be applied to transmission and reception of optical signals between the optical transmission and reception apparatuses 20-5 and 20-6 for its own apparatus.

Figure 4:
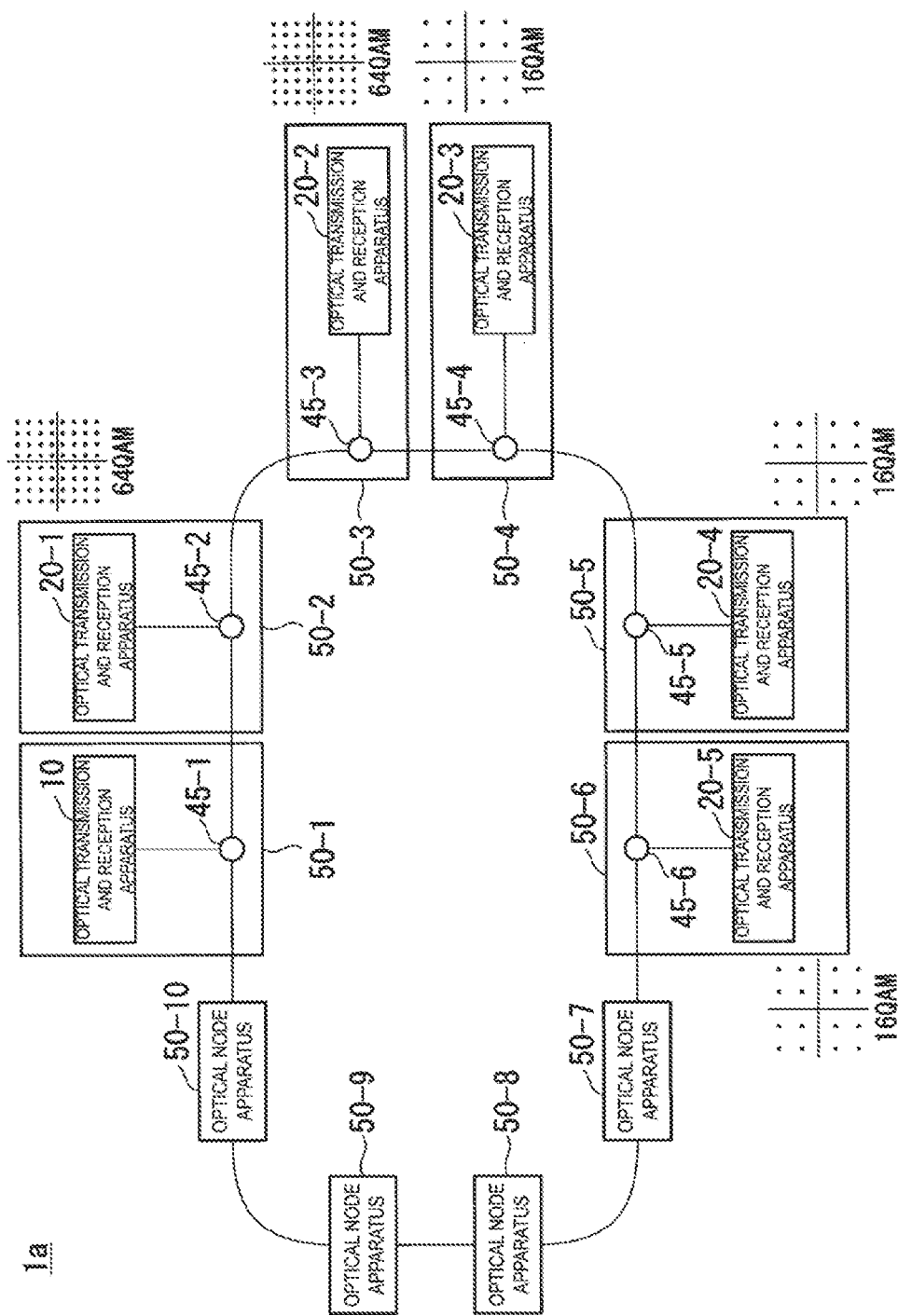
FIG. 4 is another example of a configuration of the optical transmission system according to the same embodiment.

In the first embodiment described above, the PON type optical transmission system 1 is illustrated in one example, but the configuration of the present disclosure is not limited to the embodiment described above. For example, the present disclosure may be applied to the planar communication network, and may be specifically applied to a ring type optical transmission system 1a as illustrated in FIG. 4. The optical transmission system 1a includes optical node apparatuses 50-1 to 50-10, the optical transmission and reception apparatus 10, and optical transmission and reception apparatuses 20-1 to 20-5. As illustrated in FIG. 4, the adjacent optical node apparatuses 50-1 to 50-10 are connected by optical fibers to form a ring type communication network. The optical node apparatuses 50-1 to 50-10 include optical passive elements 45-1 to 45-10 and the optical transmission and reception apparatuses 10 and 20-1 to 20-10.

Each of the optical passive elements 45-1 to 45-10 included in each of the optical node apparatuses 50-1 to 50-10 separates and combines an optical signal or selectively separates and combines an optical signal having a predetermined wavelength. For example, when viewed from the optical transmission and reception apparatus 10, the optical transmission and reception apparatuses 20-1 to 20-5 are five grounds, and at least one same wavelength is allocated to each of combinations of the optical transmission and reception apparatus 10 and the optical transmission and reception apparatuses 20-1 to 20-5 and 1-to-5 transmission and reception of optical signals is performed. In addition, a Wavelength Division Multiplexing (WDM) configuration may be used in which a plurality of wavelengths are allocated to the 1-to-5 communication of optical signals. Further, a WDM configuration may be used in which another wavelength is allocated to each of combinations of the optical transmission and reception apparatus 20-1 and the optical transmission and reception apparatuses 20-2 to 20-5 and 1-to-4 transmission and reception of optical signals is performed.

In the optical transmission system 1a illustrated in FIG. 4, the optical transmission and reception apparatuses 20-1 and 20-2 are located at distances of "less than 500 km" from the optical transmission and reception apparatus 10, and the optical transmission and reception apparatuses 20-3, 20-4, and 20-5 are located at distances of "equal to or more than 500 km and less than 1000 km" from the optical transmission and reception apparatus 10. In this case, in the same manner as the optical transmission system 1, also in the optical transmission system 1a, the communication condition setting unit 13 of the optical transmission and reception apparatus 10 sets information setting 64 QAM having high multi-levels as a modulation scheme to be applied to transmission and reception of optical signals to the optical transmission and reception apparatuses 20-1 and 20-2. Further, the communication condition setting unit 13 of the optical transmission and reception apparatus 10 sets information setting 64 QAM as the modulation scheme to be applied to transmission and reception of optical signals between the optical transmission and reception apparatuses 20-1 and 20-2 for its own apparatus.

In addition, the communication condition setting unit 13 of the optical transmission and reception apparatus 10 sets information setting 16 QAM having low multi-levels as a modulation scheme to be applied to transmission and reception of optical signals to the optical transmission and reception apparatuses 20-3, 20-4, and 20-5. Further, the communication condition setting unit 13 of the optical transmission and reception apparatus 10 sets information setting 16 QAM as the modulation scheme to be applied to transmission and reception of optical signals between the optical transmission and reception apparatuses 20-3, 20-4, and 20-5 for its own apparatus.

With this setting as described above, in the optical transmission system 1a, by applying 64 QAM having high multi-levels, the optical transmission and reception apparatus 10 and the optical transmission and reception apparatuses 20-1 and 20-2 can efficiently transmit and receive optical signals with a large communication capacity. In contrast, 16 QAM having low multi-levels is applied to the optical transmission and reception apparatus 10 and the optical transmission and reception apparatuses 20-3, 20-4, and 20-5, so that efficiency of communication is less than those of the optical transmission and reception apparatuses 20-1 and 20-2, but transmission and reception of optical signals can be stably performed. Accordingly, in the optical transmission system 1a, an appropriate communication condition can be selected for each of the optical transmission and reception apparatuses 20-1 to 20-5 in accordance with the transmission line conditions between the optical transmission and reception apparatus 10 and the optical transmission and reception apparatuses 20-1 to 20-5.

Second Embodiment

Figure 5:
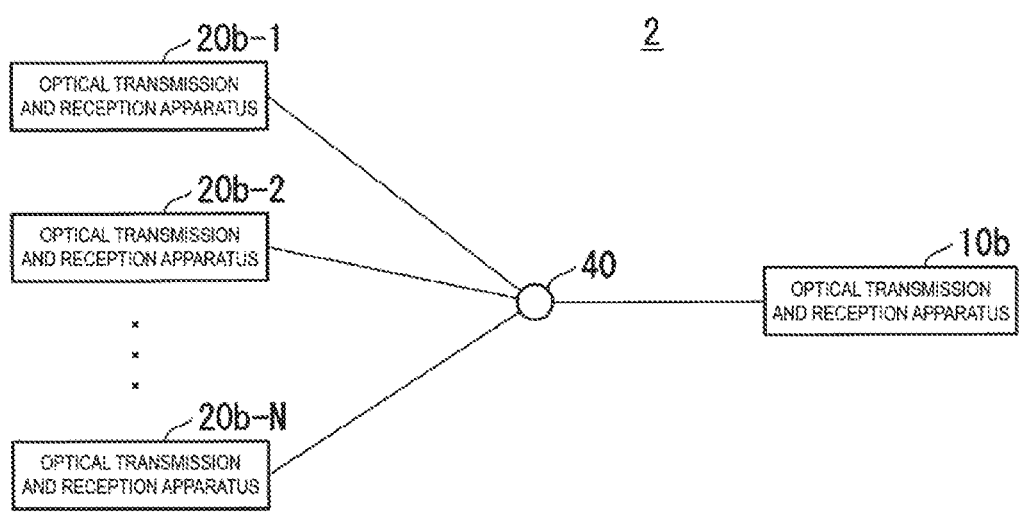
FIG. 5 is a block diagram illustrating a configuration of an optical transmission system according to a second embodiment.

FIG. 5 is a block diagram illustrating a configuration of an optical transmission system 2 according to a second embodiment. In the second embodiment, the same components as those of the first embodiment are denoted by the same reference signs, and different configurations will be described below. The optical transmission systems, for example, a PON type optical transmission system, and includes an optical transmission and reception apparatus 10b, optical transmission and reception apparatuses 20b-1 to 20b-N, and an optical multiplexer-demultiplexer 40b. Also in the second embodiment, the minimum configuration may be 1-to-1, so N is an integer equal to or greater than 1. The optical transmission and reception apparatus 10b and the optical transmission and reception apparatuses 20b-1 to 20b-N transmit and receive digital coherent optical signals through optical fibers respectively connected to the apparatuses.

The optical multiplexer-demultiplexer 40 branches an optical signal transmitted by the optical transmission and reception apparatus 10 and transmits the optical signal to the optical transmission and reception apparatuses 20b-1 to 20b-N. The optical multiplexer-demultiplexer 40 combines optical signals transmitted by the optical transmission and reception apparatuses 20b-1 to 20b-N, and transmits the optical signal to the optical transmission and reception apparatus 10b. That is, the optical transmission system 2 performs 1-to-N transmission and reception of optical signals with the optical transmission and reception apparatuses 20b-1 to 20b-N as N grounds.

The optical transmission and reception apparatus 10b is, for example, an apparatus corresponding to an Optical Line Terminal (OLT) in a PON scheme, and the optical transmission and reception apparatuses 20b-1 to 20b-N are, for example, apparatuses corresponding to Optical Network Units (ONUS). For example, a Time Division Multiplexing (TDM) scheme is applied to transmission of optical signals from the optical transmission and reception apparatus 10b to the optical transmission and reception apparatuses 20b-1 to 20b-N in a downlink direction. In contrast, for example, a Time Division Multiple Access (TDMA) scheme is applied to transmission of optical signals from the optical transmission and reception apparatuses 20b-1 to 20b-N to the optical transmission and reception apparatus 10b in an uplink direction. Further, different wavelengths are allocated to the optical signal in the uplink direction and the optical signal in the downlink direction, and transmission is performed by a wavelength multiplexing method.

Figure 6:
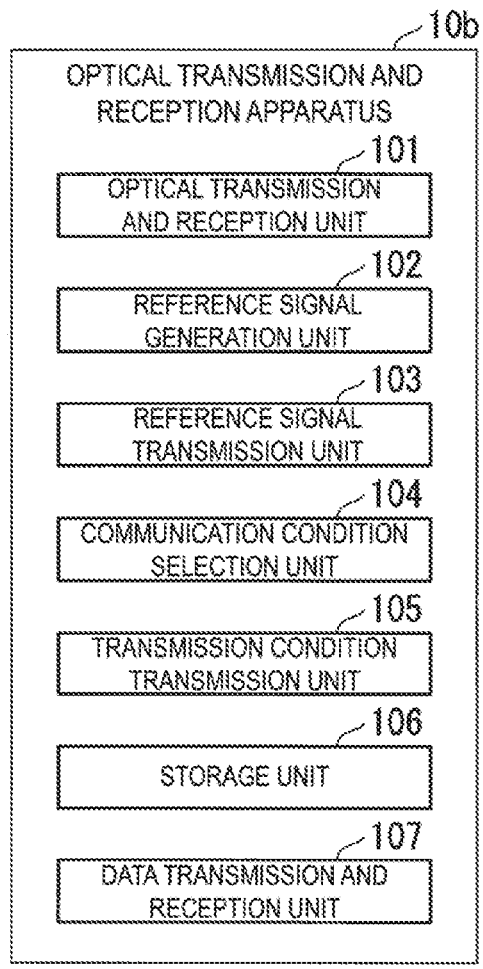
FIG. 6 is a block diagram (part 1) illustrating a configuration of an optical transmission and reception apparatus according to the same embodiment.

FIG. 6 is a block diagram illustrating a configuration of the optical transmission and reception apparatus 10b. As illustrated in FIG. 6, the optical transmission and reception apparatus 10b includes an optical transmission and reception unit 101, a reference signal generation unit 102, a reference signal transmission unit 103, a communication condition selection unit 104, a transmission condition transmission unit 105, a storage unit 106, and a data transmission and reception unit 107.

The optical transmission and reception unit 101 is connected to the optical multiplexer-demultiplexer 40 via an optical fiber, and transmits and receives optical signals to and from the optical transmission and reception apparatuses 20b-1 to 20b-N. The reference signal generation unit 102 generates a plurality of reference signals by modulating reference information corresponding for each of combinations of modulation schemes and baud rates with reference to a reference information table 1061 stored by the storage unit 106 in advance.

Figure 7:
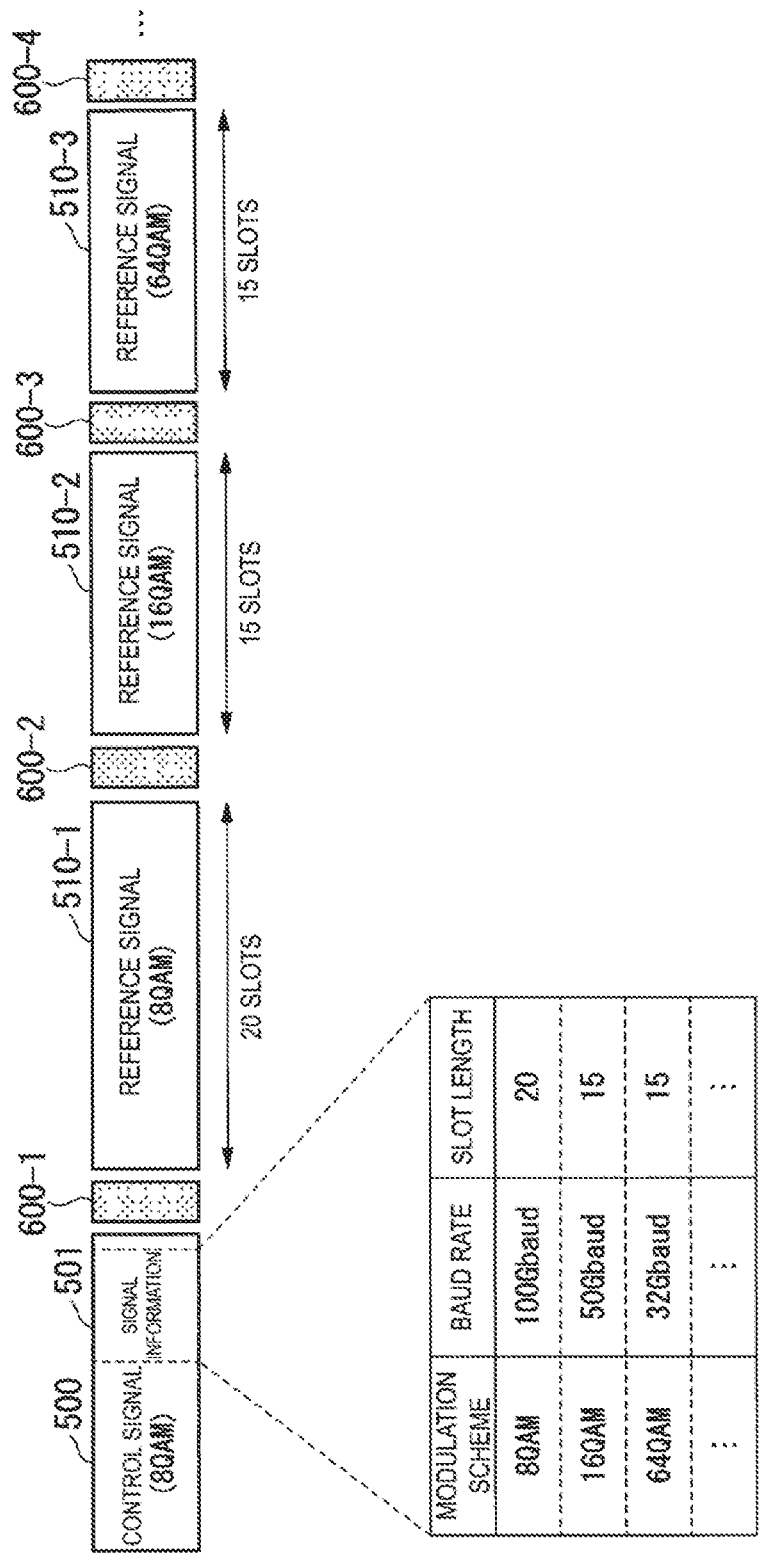
FIG. 7 is a diagram illustrating a format of a first transmission timing notification signal according to the same embodiment.

The reference signal transmission unit 103 is a signal including the plurality of reference signals generated by the reference signal generation unit 102, and transmits a first transmission timing notification signal in the format illustrated in FIG. 7, for example, to the unregistered optical transmission and reception apparatuses 20b-1 to 20b-N. The first transmission timing notification signal transmitted by the reference signal transmission unit 103 is, for example, a signal corresponding to a Discovery GATE frame to be transmitted to an unregistered ONU, by the OLT in the PON scheme.

As illustrated in FIG. 7, the first transmission timing notification signal is a signal including, for example, a control signal 500, a plurality of reference signals 510-1, 510-2, 510-3, and a plurality of guard time signals 600-1, 600-2, 600-3, 600-4, . . . .

The control signal 500 corresponds to header information of the first transmission timing notification signal, and is modulated in a common communication condition. Here, the common communication condition is a communication condition capable of correctly performing demodulation regardless of a transmission distance or the like even in any one of the optical transmission and reception apparatuses 10b and 20b-1 to 20b-N, and is assumed to be 8 QAM and 32 Gbaud, for example.

A signal information 501 included in the control signal 500 is table type information as illustrated in FIG. 7, and has items of "modulation scheme", "baud rate", and "slot length". Information to be written to the items of "modulation scheme". "baud rate", and "slot length" of the signal information 501 is information indicating a modulation scheme, a baud rate, and a slot length of each of the reference signals 510-1, 510-2, 510-3, . . . following the control signal 500 in the first transmission timing notification signal.

The guard time signals 600-1, 600-2, 600-3, 600-4, are signals inserted between the control signal 500 and the reference signals 510-1, 510-2, 510-3, . . . .

Based on information of the reference signal which can be correctly received by each of the optical transmission and reception apparatuses 20b-1 to 20b-N, the communication condition selection unit 104 selects a communication condition used for transmission and reception of optical signals with each of the optical transmission and reception apparatuses 20b-1 to 20b-N. The communication condition selection unit 104 outputs information of the selected communication condition to the data transmission and reception unit 107. In addition, the communication condition selection unit 104 writes the information of the selected communication condition for each of the optical transmission and reception apparatuses 20b-1 to 20b-N in a registration information table 1062 stored in the storage unit 106 in association with each of the optical transmission and reception apparatuses 20b-1 to 20b-N to register the optical transmission and reception apparatuses 20b-1 to 20b-N.

When registered, the communication condition selection unit 104 obtains a new registration ID, modulates a registration notification signal including the obtained registration ID and the information of the selected communication condition in the common communication condition, and transmits the registration notification signal to the registered optical transmission and reception apparatuses 20b-1 to 20b-N. This registration ID is, for example, an ID corresponding to a Logical Link ID (UM) in the PON scheme.

With reference to the registration information table 1062 stored in the storage unit 106, the transmission condition transmission unit 105 generates a second transmission timing notification signal including information of the transmission condition to be allocated when transmitting transmission information, for each registered optical transmission and reception apparatuses 20b-1 to 20b-N. Here, the transmission condition is, for example, a communication bandwidth, a transmission timing, or the like when the registered optical transmission and reception apparatuses 20b-1 to 20b-N perform transmission. The transmission condition transmission unit 105 modulates the generated second transmission timing notification signal with the common communication condition, and transmits the second transmission timing notification signal to the optical transmission and reception apparatuses 20b-1 to 20b-N corresponding to the second transmission timing notification signal. The second transmission timing notification signal transmitted by the transmission condition transmission unit 105 is, for example, a signal corresponding to the GATE frame to be transmitted to the registered ONE by the OLT in the PON scheme.

The storage unit 106 stores the reference information table 1061 illustrated in FIG. 8 and the registration information table 1062 illustrated in FIG. 9. The reference information table 1061 includes items of "modulation scheme", "baud rate", and "reference information". In the item of "modulation scheme", information of a modulation scheme such as 8 QAM, 16 QAM, 64 QAM, or the like is written in advance, and in the item of "baud rate", a baud rate value such as 100 Gbaud, 50 Gbaud, 32 Gbaud, or the like is written in advance. In the item of "reference Information", reference information, which is data to be modulated, is written in advance.

The registration information table 1062 includes items of "apparatus identification information", "registration ID", "modulation scheme", "baud rate", "slot length", and "transmission timing". For example, identification information (hereinafter, referred to as an apparatus Identification (ID)) such as an address given in advance to each of the optical transmission and reception apparatuses 20b-1 to 20b-N is written to the item of "apparatus identification information". Information of the registration ID obtained by the communication condition selection unit 104 is written to the item of "registration ID". Information of the modulation scheme and a value of the baud rate are written to the items of "modulation scheme" and "baud rate". In the items of "slot length" and "transmission timing", information of the transmission condition, that is, information of a length of a slot used when the optical transmission and reception apparatus 20b transmits transmission data, and information of a time indicating a timing of a start of the transmission. The information of the items of "slot length" and "transmission timing" is rewritten by the transmission condition transmission unit 105 each time the transmission condition transmission unit 105 allocates a new transmission condition to each of the optical transmission and reception apparatuses 20b-1 to 20b-N.

The data transmission and reception unit 107 demodulates reception data received from each of the optical transmission and reception apparatuses 20b-1 to 20b-N in accordance with the communication condition selected by the communication condition selection unit 104 for each of the optical transmission and reception apparatuses 20b-1 to 20b-N. The data transmission and reception unit 107 modulates transmission data transmitted to each of the optical transmission and reception apparatuses 20b-1 to 20b-N ire accordance with the communication condition selected by the communication condition selection unit 104 for each of the optical transmission and reception apparatuses 20b-1 to 20b-N, and transmits the modulated transmission data to the optical transmission and reception apparatuses 20b-1 to 20b-N.

For example, a DSP which is a hardware which performs a modulation process or a demodulation process provided by the optical transmission and reception apparatus 10b is connected to the optical transmission and reception unit 101, and is configured to be shared by the reference signal transmission unit 103, the communication condition selection unit 104, the transmission condition transmission unit 105, and the data transmission and reception unit 107 which perform a modulation process or a demodulation process in the common communication condition. The common communication condition is typically set to the DSP, and in a case where the data transmission unit 107 performs transmission and reception based on the communication condition selected by the communication condition selection unit 104, the data transmission unit 107 sets the communication condition to the DSP.

Figure 10:
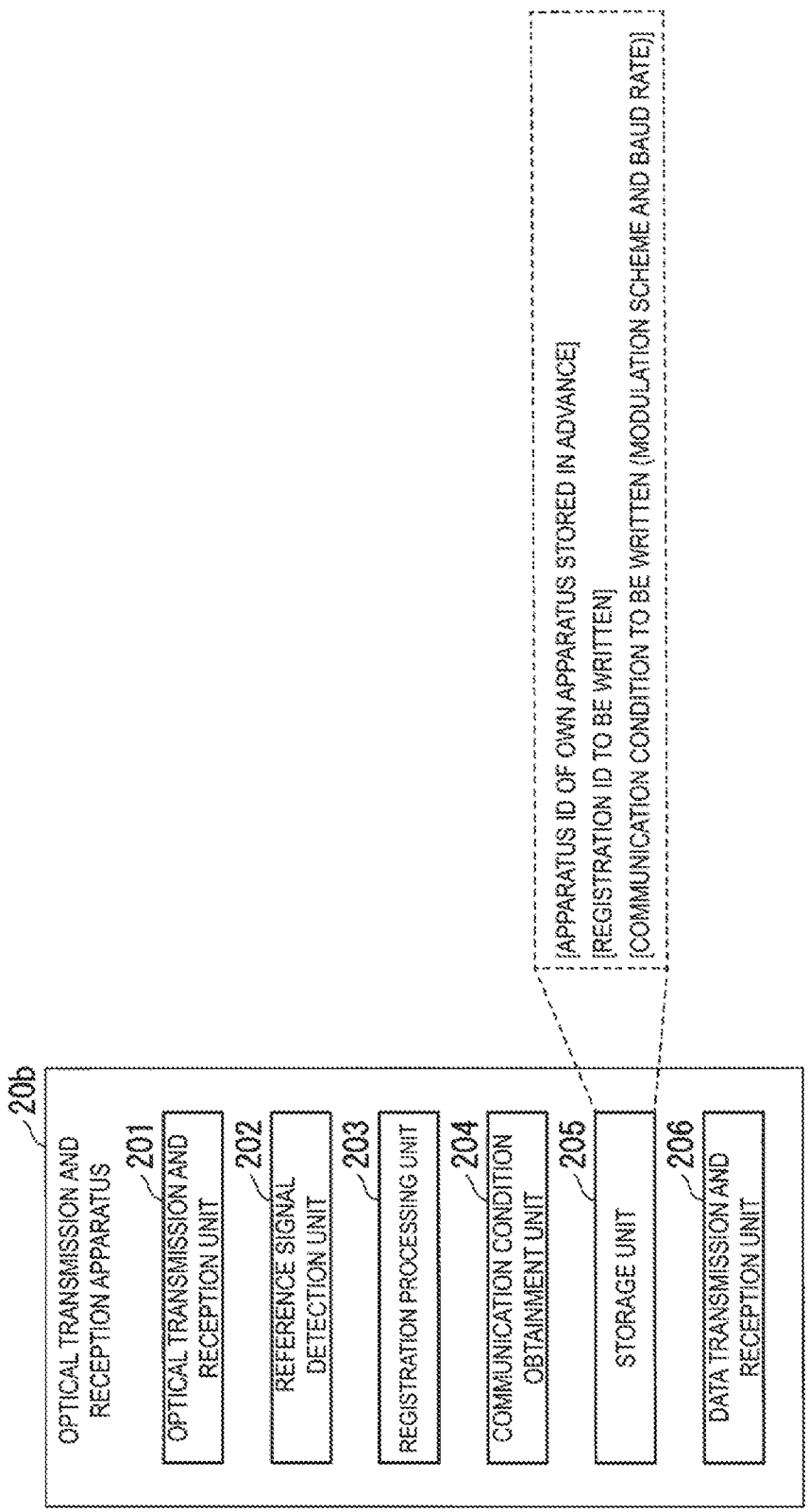
FIG. 10 is a block diagram (part 2) illustrating the configuration of the optical transmission and reception apparatus according to the same embodiment.

FIG. 10 is a block diagram illustrating a configuration of an optical transmission and reception apparatus 20b. The optical transmission and reception apparatuses 20b-1 to 20b-N illustrated in FIG. 5 are provided with the same internal configuration, and in a case where any one of the optical transmission and reception apparatuses 20*b*-1 to 20*b*-N is illustrated hereinafter, the optical transmission and reception apparatus 20*b* is indicated with the reference numeral of "20*b*" as illustrated in FIG. 10. In addition, in a case where the internal configurations of the optical transmission and reception apparatuses 20*b*-1 to 20*b*-N are illustrated individually, for example, when "optical transmission and reception unit" of the optical transmission and reception apparatus 20*b*-1, it is indicated by adding a branch number such as "optical transmission and reception unit 201-1".

As illustrated in FIG. 10, the optical transmission and reception apparatus 20*b* includes an optical transmission and reception unit 201, a reference signal detection unit 202, a registration processing unit 203, a communication condition obtainment unit 204, a storage unit 205, and a data transmission and reception unit 206. The optical transmission and reception unit 201 is connected to the optical multiplexer-demultiplexer 40 via an optical fiber, and transmits and receives optical signals to and from the optical transmission and reception apparatus 10*b*.

The reference signal detection unit 202 receives the first transmission timing notification signal transmitted by the optical transmission and reception apparatus 10*b*. The reference signal detection unit 202 references the signal information 501 of the control signal 500 included in the received first transmission timing notification signal, and demodulates the reference signals 510-1, 510-2, 510-3, . . . included in the first transmission timing notification signal. The reference signal detection unit 202 detects the reference signals 510-1, 510-2, 510-3, . . . successfully demodulated, and outputs information related to the detected reference signals 510-1, 510-2, 510-3, . . . .

The registration processing unit 203 generates a registration request signal including the information related to the reference signals 510-1, 510-2, 510-3, . . . output by the reference signal detection unit 202 and an apparatus ID allocated to an own apparatus. The registration processing unit 203 modulates the generated registration request signal in a common communication condition and transmits the registration request signal to the optical transmission and reception apparatus 10*b*. The registration processing unit 203 receives the registration notification signal transmitted by the optical transmission and reception apparatus 10*b*, and writes and stores the registration ID and the information indicating the communication condition included in the received registration notification signal in the storage unit 205.

The communication condition obtainment unit 204 receives the second transmission timing notification signal transmitted by the optical transmission and reception apparatus 10*b*, and reads the information of the transmission condition from the received second transmission timing notification signal. The communication condition obtainment unit 204 outputs the read information of the transmission condition to the data transmission and reception unit 206, modulates the received response signal in the common communication condition, and transmits the information to the optical transmission and reception apparatus 10*b*. The storage unit 205 stores the apparatus ID allocated to the own apparatus in advance, and stores the registration ID and the information of the communication condition written by the registration processing unit 203.

The data transmission and reception unit 206 reads reception data corresponding to the registration ID allocated to the own apparatus from the reception data received from the optical transmission and reception apparatus 10*b*, and demodulates the read reception data in accordance with the communication condition stored in the storage unit 205. The data transmission and reception unit 206 modulates transmission data to be transmitted to the optical transmission and reception apparatus 10*b* in accordance with the communication condition stored in the storage unit 205, and transmits the modulated transmission data in accordance with the transmission condition obtained by the communication condition obtainment unit 204.

For example, a DSP, which is a hardware which performs a modulation process or a demodulation process, included in the optical transmission and reception apparatus 20*b* is connected to the optical transmission and reception unit 201, and is configured to be shared by the reference signal detection unit 202, the registration processing unit 203, the communication condition obtainment unit 204, and the data transmission and reception unit 206 which perform a modulation process or a demodulation process in the common communication condition. The common communication condition is typically set to the DSP, and in a case where the reference signal detection unit 202 performs the demodulation process based on the communication condition of the signal information 501 of the first transmission timing notification signal, the reference signal detection unit 202 sets the communication condition to the DSP. The data transmission unit 206 sets the communication condition to the DSP even in a case where the data transmission unit 206 performs transmission and reception based on the communication condition selected by the communication condition obtainment unit 204.

Process by Optical Transmission System According to Second Embodiment

Figure 11:
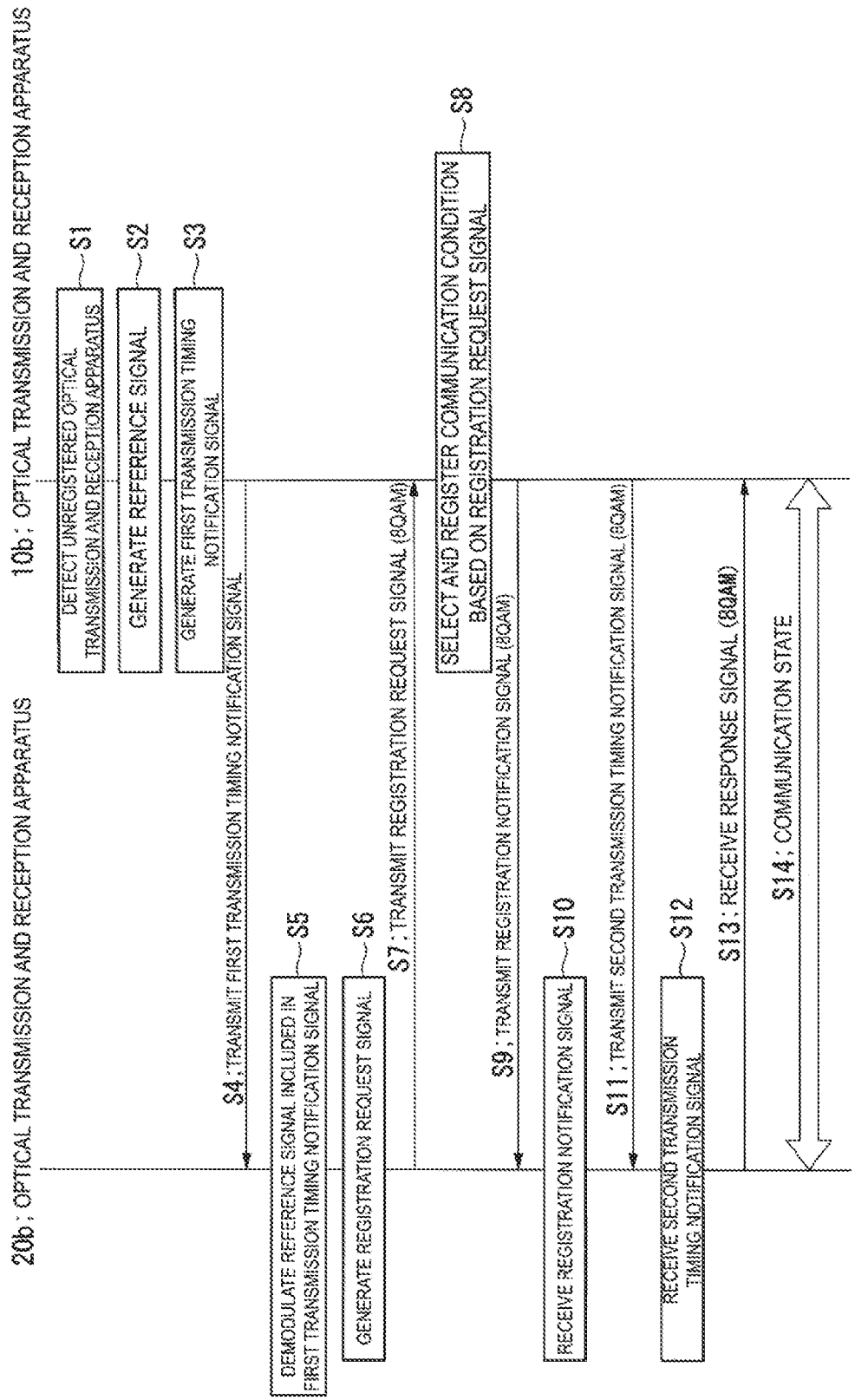
FIG. 11 is a sequence diagram illustrating a flow of processes by the optical transmission system according to the same embodiment.

FIG. 11 is a sequence diagram illustrating a flow of processes by the optical transmission system 2 according to the second embodiment. When the unregistered optical transmission and reception apparatus 20*b* is connected to the optical multiplexer-demultiplexer 40, the reference signal transmission unit 103 of the optical transmission and reception apparatus 10*b* detects the presence of the unregistered optical transmission and reception apparatus 20*b* via the optical transmission and reception unit 101 (step S1).

The reference signal transmission unit 103 outputs instruction information to generate the reference signals 510-1, 510-2, 510-3, . . . to the reference signal generation unit 102. When receiving the instruction information from the reference signal transmission unit 103, the reference signal generation unit 102 references the reference information table 1061 of the storage unit 106.

The reference signal generation unit 102 reads 8 QAM, 100 Gbaud, and reference information A as items of "modulation scheme", "baud rate", and "reference information" on a first row in the reference information table 1061, modulates the read reference information A in a communication condition of 8 QAM and 100 Gbaud, and generates the reference signal 510-1. The reference signal generation unit 102 outputs the generated reference signal 510-1 and information of 8 QAM and 100 Gbaud, which is information of the communication condition corresponding to the reference signal 510-1, to the reference signal transmission unit 103.

Next, the reference signal generation unit 102 reads 16 QAM, 50 Gbaud, and reference information B as the items of "modulation scheme", "baud rate", and "reference information" on a second row in the reference information table 1061. The reference signal generation unit 102 modulates the read reference information B in a communication condition of 16 QAM and 50 Gbaud, and generates the reference signal 510-2. The reference signal generation unit 102 outputs the generated reference signal 510-2 and information of 16 QAM and 50 Gbaud, which is information of the communication condition corresponding to the reference signal 510-2, to the reference signal transmission unit 103.

Further, the reference signal generation unit 102 reads 64 QAM, 32 Gbaud, and reference information C as the items of "modulation scheme", "baud rate", and "reference information" on a third row in the reference information table 1061. The reference signal generation unit 102 modulates the read reference information C in a communication condition of 64 QAM and 32 Gbaud, and generates the reference signal 510-3. The reference signal generation unit 102 outputs the generated reference signal 510-3 and information of 64 QAM and 32 Gbaud, which is information of the communication condition corresponding to the reference signal 510-3, to the reference signal transmission unit 103.

The reference signal generation unit 102 repeatedly generates a reference signal for all of the reference information A, B, . . . stored in the reference information table 1061, and outputs the generated reference signal and information of a communication condition corresponding to the reference signal to the reference signal transmission unit 103 (step S2).

The reference signal transmission unit 103 obtains the reference signals 510-1, 510-2, 510-3, . . . output by the reference signal generation unit 102 and the information of the communication condition corresponding to each of the reference signals 510-1, 510-2, 510-3, . . . , and generates the first transmission timing notification signal illustrated in FIG. 7.

For example, when obtaining the reference signal 510-1 output by the reference signal generation unit 102, the reference signal transmission unit 103 calculates a slot length required for transmission according to a size of the reference signal 510-1. Here, it is assumed that "20" is calculated as the slot length corresponding to the reference signal 510-1.

The reference signal transmission unit 103 obtains information of the modulation scheme of 8 QAM and information of the baud rate of 100 Gbaud as information of the communication condition corresponding to the reference signal 510-1 output by the reference signal generation unit 102. The reference signal transmission unit 103 writes and stores the obtained information of the 8 QAM modulation scheme and the baud rate of 100 Gbaud, and the calculated slot length of "20" in the items of "modulation scheme", "baud rate", and "slot length" of the signal information 501.

The reference signal transmission unit 103 inserts the guard time signal 600-1 between the control signal 500 and the reference signal 510-1 to couple the control signal 500 and the reference signal 510-1. The reference signal transmission unit 103 performs the same process as the process performed on the reference signal 510-1, on the reference signals 510-2, 510-3, . . . . Accordingly, the signal information 501 corresponding to the reference signal 510-2 has a modulation scheme of "16 QAM" a baud rate of "50 Gbaud", and a slot length of "15". The signal information 501 corresponding to the reference signal 510-3 has a modulation scheme of "64 QAM", a baud rate of "32 Gbaud", and a slot length of "15".

As a length of the guard time signals 600-1, 600-2, 600-3, 600-4, . . . , a signal length corresponding to a sufficient time, when the DSP of the optical transmission and reception apparatus 20b can switch communication conditions, is predetermined. The reference signal transmission unit 103 inserts the guard time signals 600-1, 600-2, 600-3, 600-4, . . . having predetermined lengths.

The reference signal transmission unit 103 finally modulates the control signal 500 in the common communication condition, and generates the first transmission timing notification signal illustrated in FIG. 7 (step S3). The reference signal transmission unit 103 transmits the generated first transmission timing notification signal to the unregistered optical transmission and reception apparatus 20b via the optical transmission and reception unit 101 (step S4).

The reference signal detection unit 202 of the optical transmission and reception apparatus 20b receives the first transmission timing notification signal transmitted by the optical transmission and reception apparatus 10b via the optical transmission and reception unit 201. The reference signal detection unit 202 demodulates the control signal 500 of the first transmission timing notification signal in accordance with the common communication condition, and reads information stored in the signal information 501 included in the demodulated control signal 500. While detecting the guard time signal 600-1 following the control signal 500, the reference signal detection unit 202 changes the setting of the DSP from the common communication condition to a communication condition of "8 QAM" and "100 Gbaud" written in a first row in the table of signal information 501.

When detecting an end of the guard time signal 600-1, the reference signal detection unit 202 reads the reference signal 510-1 having 20 slots following the guard time signal 600-1. The reference signal detection unit 202 demodulates the read reference signal 510-1 in accordance with the communication condition of "8 QAM" and "100 Gbaud".

For example, in the demodulation process, the reference signal detection unit 202 calculates a Bit Error Rate (BER) of the reference signal 510-1, and in a case where the BER is less than or equal to a predetermined threshold value, the reference signal detection unit 202 detects the reference signal 510-1 as a reference signal successfully demodulated. In a case where the reference signal 510-1 is detected as the reference signal successfully demodulated, the reference signal detection unit 202 outputs the reference information A obtained by demodulating the reference signal 510-1 as information related to the reference signal 510-1 to the registration processing unit 203.

In the same manner, the reference signal detection unit 202 detects the guard time signal 600-2 that follows the reference signal 510-1. While detecting the guard time signal 600-2, the reference signal detection unit 202 changes the setting of the DSP from the communication condition of "8 QAM" and "100 Gbaud" to a communication condition of "16 QAM" and "50 Gbaud" written in a second row of the table of signal information 501. When detecting an end of the guard time signal 600-2, the reference signal detection unit 202 reads the reference signal 510-2 having 15 slots following the guard time signal 600-2. The reference signal detection unit 202 demodulates the read reference signal 510-2 in accordance with the communication condition of "16 QAM" and "50 Gbaud".

In a case where it is determined that the reference signal 510-2 is successfully demodulated, the reference signal detection unit 202 outputs the reference information B obtained from the reference signal 510-2 successfully demodulated, as information related to the reference signal 510-2 to the registration processing unit 203. The reference signal detection unit 202 performs the same process as the process performed on the reference signals 510-1 and 510-2 on the reference signal 510-3 following the reference signal 510-2 and the subsequent reference signals (step S5).

The registration processing unit 203 reads the apparatus ID stored in advance by the storage unit 205, and generates a registration request signal including the read apparatus ID and information related to the reference signal output by the reference signal detection unit 202, that is, the reference information A, B, C, . . . successfully demodulated (step S6). The registration processing unit 203 modulates the generated registration request signal in the common communication condition and transmits the registration request signal to the optical transmission and reception apparatus 10b via the optical transmission and reception unit 201 (step S7).

The communication condition selection unit 104 of the optical transmission and reception apparatus 10b receives the registration request signal transmitted by the optical transmission and reception apparatus 20b via the optical transmission and reception unit 101. The communication condition selection unit 104 demodulates the registration request signal in the common communication condition, and reads the apparatus ID and each of the reference information A, B, C, . . . included in the demodulated registration request signal.

The communication condition selection unit 104 compares each of the reference information A, B, C, . . . included in the registration request signal with the reference information A, B, C, . . . written in the item of "reference information" of the reference information table 1061 stored by the storage unit 106 to detect a record which coincides with the reference information A, B, C, . . . included in the registration request signal. The communication condition selection unit 104 reads, from the detected record, the information of the modulation scheme written in the item of "modulation scheme" corresponding to each of the reference information A, B, C, . . . included in the registration request signal, and a value of the baud rate written in the item of "baud rate".

The communication condition selection unit 104 selects one of communication conditions indicated by combinations of the information of the read modulation scheme and the value of the baud rate. For example, the communication condition selection unit 104 selects a communication condition with e greatest communication bandwidth. Here, for example, the communication condition selection unit 104 performs the following description when selecting a communication condition with the modulation scheme of "64 QAM" and the baud rate of "32 Gbaud".

The communication condition selection unit 104 obtains anew registration ID, and writes the apparatus ID included in the registration request signal, the obtained registration ID, and information of the selected communication condition in a corresponding item in the registration information table 1062 of the storage unit 106 to register the optical transmission and reception apparatus 20b (step S8).

The communication condition selection unit 104 generates a registration notification signal including the registration ID and the selected communication condition, modulates the generated registration notification signal in the common communication condition, and transmits the registration notification signal to the optical transmission and reception apparatus 20b via the optical transmission and reception unit 101 (step S9).

The communication condition obtainment unit 204 of the optical transmission and reception apparatus 20b receives the registration notification signal transmitted by the optical transmission and reception apparatus 10b via the optical transmission and reception unit 201. The communication condition obtainment unit 204 demodulates the received registration notification signal in the common communication condition, and reads the registration ID and the information of the communication condition, selected by the communication condition selection unit 104, included in the demodulated registration notification signal. The communication condition obtainment unit 204 writes and stores the read registration ID and information of the communication condition in the storage unit 205 (step S10).

The transmission condition transmission unit 105 of the optical transmission and reception apparatus 10b reads the information of the communication condition corresponding to the optical transmission and reception apparatus 20b registered in the storage unit 106. Here, as described above, the storage unit 106 stores the communication condition with the modulation scheme "64 QAM" and the baud rate of "32 Gbaud" as a communication condition corresponding to the optical transmission and reception apparatus 20b. Thus, the transmission condition transmission unit 105 reads the 64 QAM and 32 Gbaud.

The transmission condition transmission unit 105 calculates a communication bandwidth allocated to the optical transmission and reception apparatus 20b and a transmission timing. Based on the calculated communication bandwidth and the read communication condition with 64 QAM and 32 Gbaud, the transmission condition transmission unit 105 calculates a slot length to be allocated to the optical transmission and reception apparatus 20b. The transmission condition transmission unit 105 writes and stores the calculated slot length and information of the transmission timing in the registration information table 1062 of the storage unit 106 in association with the optical transmission and reception apparatus 20b. The transmission condition transmission unit 105 modulates the second transmission timing notification signal including the calculated slot length and the information of the transmission timing in the common communication condition and transmits the second transmission timing notification signal to the optical transmission and reception apparatus 20b via the optical transmission and reception unit 101 (step S11).

The transmission condition transmission unit 105 dynamically calculates the communication and the transmission timing for the optical transmission and reception apparatus 20b according to the amount of data transmitted by the optical transmission and reception apparatus 20b, in accordance with Dynamic Bandwidth Allocation (DBA), for example.

The data transmission and reception unit 206 of the optical transmission and reception apparatus 20b receives the second transmission timing notification signal transmitted by the optical transmission and reception apparatus 10b via the optical transmission and reception unit 201 (step S12). The data transmission and reception unit 206 demodulates the second transmission timing notification signal in the common communication condition, and reads the slot length and the information of the transmission timing from the demodulated second transmission timing notification signal.

The data transmission and reception unit 206 of the optical transmission and reception apparatus 20b generates a reception response signal including the registration ID of the own apparatus stored in the storage unit 205, modulates the generated reception response signal in the common communication condition, and transmits the reception response signal to the optical transmission and reception apparatus 10b via the optical transmission and reception unit 201 (step S13). The data transmission and reception unit 107 of the optical transmission and reception apparatus 10b receives the reception response signal transmitted by the optical transmission and reception apparatus 20b via the optical transmission and reception unit 101. The data transmission and reception unit 107 demodulates and obtains the received reception response signal in the common communication condition, and in a communication state in which data transmission and reception is performed with the data transmission and reception unit 206 of the optical transmission and reception apparatus 20b at the communication condition selected by the communication condition selection unit 104 (step S14).

Figure 12:
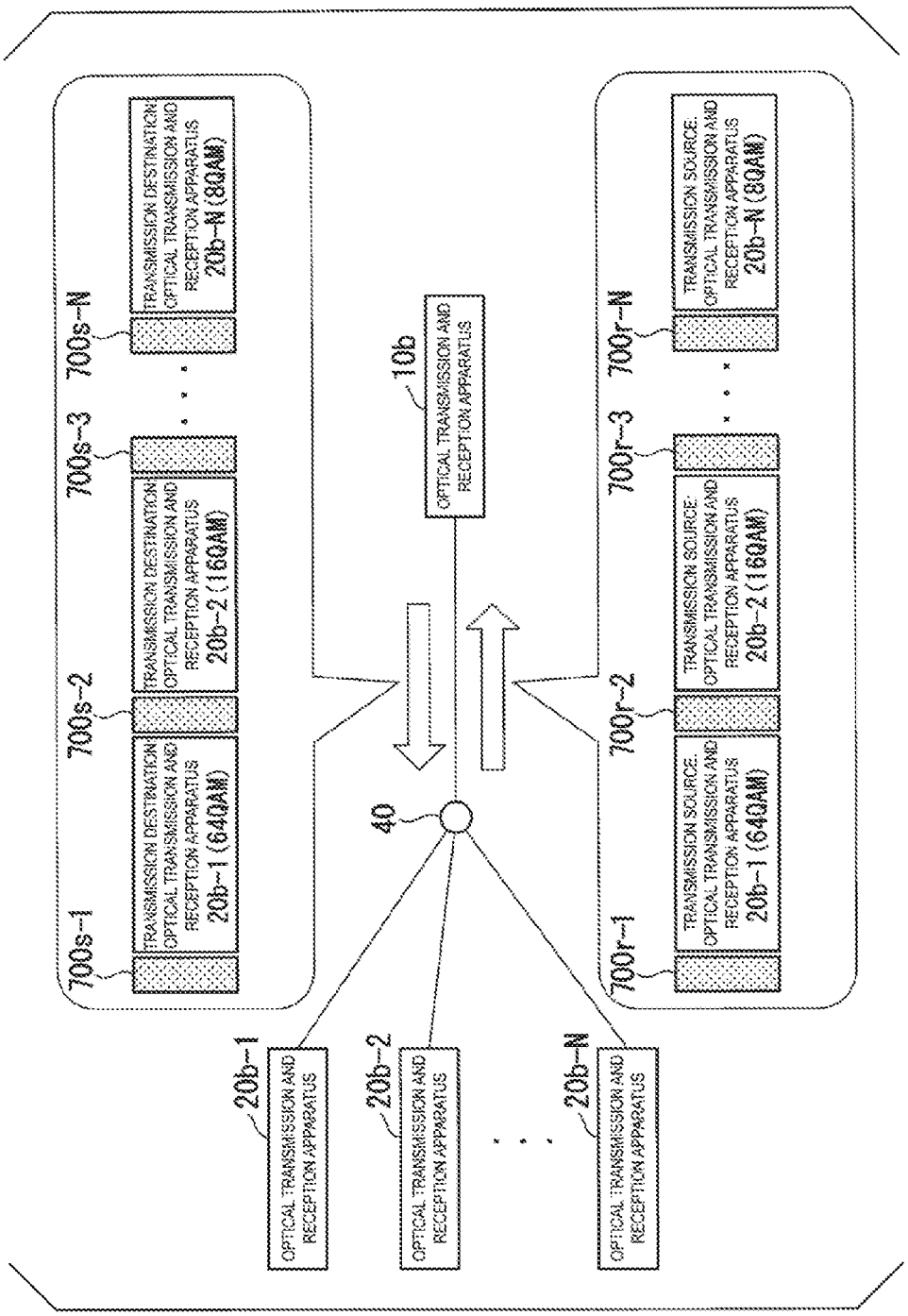
FIG. 12 is a diagram illustrating a communication state by the optical transmission system according to the same embodiment.

As a result, as illustrated in FIG. 12, the optical transmission and reception apparatus 10b can select an appropriate communication condition for each of the optical transmission and reception apparatuses 20b-1 to 20b-N in accordance with the transmission line condition with each of the optical transmission and reception apparatuses 20b-1 to 20b-N, that is, in accordance with the demodulation state of each of the reference signals 510-1, 510-2, 510-3, . . . of the optical transmission and reception apparatuses 20b-1 to 20b-N.

Uplink Communication in Communication State

In the configuration of the second embodiment described above, a case where the optical transmission and reception apparatus 20b transmits data to the optical transmission and reception apparatus 10b will be described. The data transmission and reception unit 206 of the optical transmission and reception apparatus 20b reads a communication condition stored in the storage unit 205, that is, the communication condition of 64 QAM and 32 Gbaud, and sets the communication condition to the DSP. The data transmission and reception unit 206 modulates transmission data to be transmitted to the optical transmission and reception apparatus 10b in accordance with the communication condition of 64 QAM and 32 Gbaud.

The data transmission and reception unit 206 selects transmission data of a size corresponding to a slot length read from the second transmission timing notification signal, from the modulated transmission data. The data transmission and reception unit 206 transmits the selected transmission data to the optical transmission and reception apparatus 10b via the optical transmission and reception unit 201 at a time indicated by a transmission timing read from the second transmission timing notification signal. As illustrated in FIG. 12, the data transmission and reception unit 206 adds guard time signals 700r-1 to 700r-N to the transmission data due to a time required to change a modulation scheme on the reception side, and transmits the transmission data. When changing the modulation scheme on the reception side is performed at high speed, the guard time signals 700r-1 to 700r-N may not be inserted.

The data transmission and reception unit 107 of the optical transmission and reception apparatus 10b receives the transmission data transmitted by the optical transmission and reception apparatus 20b via the optical transmission and reception unit 101. With reference to the registration information table 1062 of the storage unit 106, the data transmission and reception unit 107 reads reception data of a length of the corresponding "slot length" for each time written to the item of "transmission timing". The data transmission and reception 107 switches the communication condition used for demodulation of the reception data set to DSP into a communication condition indicated by the items of the corresponding "modulation scheme" and "baud rate", for each time written to the item "transmission timing". The data transmission and reception unit 107 demodulates the reception data received from the optical transmission and reception apparatus 20b in the communication condition switched in accordance with the transmission timing, and obtains the transmission data transmitted by the optical transmission and reception apparatus 20b.

Downlink Communication in Communication State

In the configuration of the second embodiment described above, a case where the optical transmission and reception apparatus 10b transmits data to the optical transmission and reception apparatus 20b will be described. When transmission data to be transmitted to the optical transmission and reception apparatus 20b is generated, the data transmission and reception unit 107 of the optical transmission and reception apparatus 10b refers to the registration information table 1062 of the storage unit 106, reads a registration ID corresponding to the optical transmission and reception apparatus 20b and a communication condition having a modulation scheme of 64 QAM and a baud rate of 32 Gbaud, and sets the read communication condition to the DSIP.

The data transmission and reception unit 107 modulates the transmission data to be transmitted to the optical transmission and reception apparatus 20b in the read communication condition. A downlink direction is a TDM scheme, so that a slot is allocated in advance for each registration ID. Thus, the data transmission and reception unit 107 writes the modulated transmission data to a slot corresponding to the read registration ID, and transmits the transmission data via the optical transmission and reception unit 101.

As illustrated in FIG. 12, the data transmission and reception unit 107 adds guard time signals 700s-1 to 700s-N to the transmission data due to a time required to change a modulation scheme on the reception side, and transmits the transmission data. When changing the modulation scheme on the reception side is performed at high speed, the guard time signals 700s-1 to 700s-N may not be inserted.

The data transmission and reception unit 206 of the optical transmission and reception apparatus 20b receives the transmission data transmitted by the optical transmission and reception apparatus 10b via the optical transmission and reception unit 201 as reception data, and reads the reception data written in the slot corresponding to the registration ID allocated to the own apparatus in the reception data.

The data transmission and reception unit 206 reads the communication condition having 64 QAM and 32 Gbaud stored by the storage unit 205, set to the DSP, demodulates the reception data, and obtains the transmission data transmitted by the optical transmission and reception apparatus 10b.

According to the configuration of the second embodiment described above, by modulating the data based on each candidate of the communication condition transmittable and receivable by the own apparatus, the reference signal generation unit 102 of the optical transmission and reception apparatus 10b generates the plurality of reference signals 510-1, 510-2, . . . corresponding to each candidate for the communication condition. The reference signal transmission unit 103 transmits the plurality of reference signals 510-1, 510-2, . . . generated by the reference signal generation unit 102 and information of the communication condition corresponding to the plurality of reference signals 510-1, 510-2, . . . to the optical transmission and reception apparatus 20b. The reference signal detection unit 202 of the optical transmission and reception apparatus 20b receives the plurality of reference signals 510-1, 510-2, . . . and the information of the communication condition corresponding to the plurality of reference signals 510-1, 510-2, . . . transmitted from the optical transmission and reception apparatus 10b, demodulates the received plurality of reference signals 510-1, 510-2, . . . based on the communication condition corresponding to the plurality of reference signals 510-1, 510-2, . . . , and detects the reference signals 510-1, 510-2, . . . successfully demodulated. The registration processing unit 203 transmits a registration request signal including the information related to the reference signals 510-1, 510-2, . . . detected by the reference signal detection unit 202 to the optical transmission and reception apparatus 10b. The communication condition selection unit 104 of the optical transmission and reception apparatus 10b selects a communication condition for transmission and reception with the optical transmission and reception apparatus 20b based on the information related to the reference signals 510-1, 510-2, . . . detected by the reference signal detection unit 202 of the optical transmission and reception apparatus 20b. The optical transmission and reception apparatus 10b and the optical transmission and reception apparatus 20b transmit and receive optical signals in accordance with the communication condition selected by the communication condition selection unit 104. As a result, a result of successful demodulation of the reference signals 510-1, 510-2, . . . indicates a condition of a transmission line between the optical transmission and reception apparatus 10b and the optical transmission and reception apparatus 20b. Thus, when the communication condition selection unit 104 selects a communication condition corresponding to the reference signals 510-1, 510-2, successfully demodulated, in accordance with a transmission line condition for each of the optical transmission and reception apparatuses 20b-1 to 20b-N which are grounds, it is possible to select an appropriate communication condition for each of the optical transmission and reception apparatuses 20b-1 to 20b-N. Accordingly, in the optical transmission system 2 which performs 1-to-N transmission and reception of optical signals, an appropriate communication condition can be selected for each ground in accordance with a transmission line condition for each ground.

In the configuration of the second embodiment described above, the registration processing unit 203 of the optical transmission and reception apparatus 20b includes reference information corresponding to a reference signal detected by the reference signal detection unit 202 in a registration request signal as information related to the reference signal and transmits the registration request signal to the optical transmission and reception apparatus 10b but the configuration of the present disclosure is not limited to the embodiment described above. For example, it is assumed that the reference information table 1061 of the storage unit 106 of the optical transmission and reception apparatus 10b stores the modulated and generated reference signal in addition to the reference information. In this case, the registration processing unit 203 may include the reference signal detected by the reference signal detection unit 202 in the registration request signal as information related to the reference signal and transmit the registration request signal to the optical transmission and reception apparatus 10b. In this case, the communication condition selection unit 104 of the optical transmission and reception apparatus 10b is configured to detect a corresponding communication condition from the reference information table 1061 based on the reference signal. Without including the reference information and the reference signal in the registration request signal, the reference signal detection unit 202 may include the information related to the communication condition successfully demodulated in the registration request signal as information related to the reference signal and transmit the registration request signal to the optical transmission and reception apparatus 10b.

In this case, the communication condition selection unit 104 may select any one communication condition among the communication conditions included in the received registration request signal.

Further, in the configuration of the second embodiment described above, the communication condition selection unit 104 of the optical transmission and reception apparatus 10b selects the communication condition, but the configuration of the present disclosure is not limited to the embodiment described above. The reference signal detection unit 202 or the registration processing unit 203 of the optical transmission and reception apparatus 20b may select one of the communication conditions and include information of the selected communication condition in the registration request signal, and transmit the registration request signal to the communication condition selection unit 104 of the optical transmission and reception apparatus 10b. In this case, the communication condition selection unit 104 of the optical transmission and reception apparatus 10b sets one communication condition included in the registration request signal as a communication condition with the optical transmission and reception apparatus 20b.

In the configuration of the second embodiment described above, in step S9 illustrated in FIG. 11, the communication condition selected by the communication condition selection unit 104 is included in the registration notification signal and the registration notification signal is transmitted to the optical transmission and reception apparatus 20b, but the configuration of the present disclosure is not limited to the embodiment described above. For example, without including the communication condition selected by the communication condition selection unit 104 in the registration notification signal, when the transmission condition transmission unit 105 transmits the second transmission timing notification signal, the communication condition selected by the communication condition selection unit 104 together with the slot length and the transmission timing are included and transmitted. In this case, the data transmission and reception unit 206 which receives the second transmission timing notification signal is configured to read the information of the communication condition included in the second transmission timing notification signal, and writes and stores the information of the read communication condition in the storage unit 205.

Further, in the configuration of the second embodiment described above, in step S5 in FIG. 11, the reference signal detection unit 202 determines whether or not demodulation is successfully performed by using the BER, but the configuration of the present disclosure is not limited to the embodiment described above. For example, the reference information table 1061 illustrated in FIG. 8 is stored in advance in the storage unit 205 of the optical transmission and reception apparatus 20b, and the reference signal detection unit 202 may determine whether or not demodulation is successfully performed depending on whether or not the reference information obtained by demodulating the reference signal and the information of the item of "reference information" in the reference information table 1061 stored in the storage unit 205 coincide with each other.

In the configuration of the second embodiment described above, a combination of both of the modulation scheme and the baud rate is applied as a communication condition, but the configuration of the present disclosure is not limited to the embodiments described above. For example, a combination in which the baud rate is a fixed value and only the modulation scheme is variable may be used as the communication condition, or a combination in which the modulation scheme is fixed and only the baud rate is a variable value may be used as the communication condition.

In the first transmission timing notification signal illustrated in FIG. 7, lengths of the reference signals 510-1, 510-2, 510-3, . . . are variable, but in the first transmission timing notification signal in FIG. 7, the reference signals 510-1, 510-2, 510-3, . . . may have the same fixed length.

Further, the configuration of the second embodiment described above may be applied to the configuration in FIG. 3 or the configuration in FIG. 4. As described above, the configuration of the second embodiment may be applied to a configuration of WDM in which one wavelength is allocated to the optical transmission and reception apparatus 10 with the optical transmission and reception apparatuses 20-1 to 20-5 as grounds in a 1-to-5 configuration or in which one wavelength is allocated to the optical transmission and reception apparatus 20-1 with the optical transmission and reception apparatuses 20-2 to 20-5 as grounds in a 1-to-4 configuration, in the configuration in FIG. 4.

Figure 13:
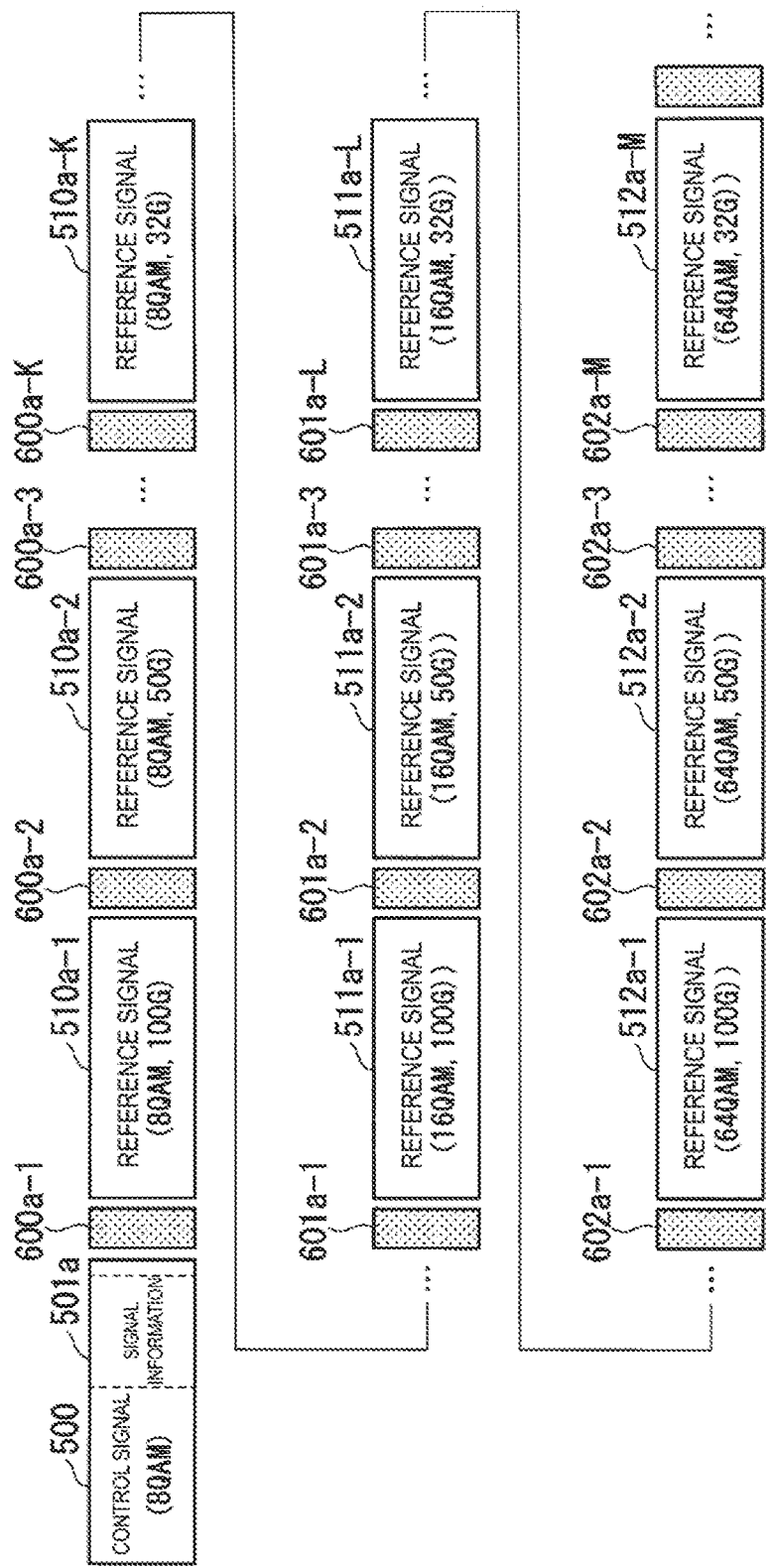
FIG. 13 is a diagram (part 1) illustrating another format of the first transmission timing notification signal according to the same embodiment.
Figure 14:
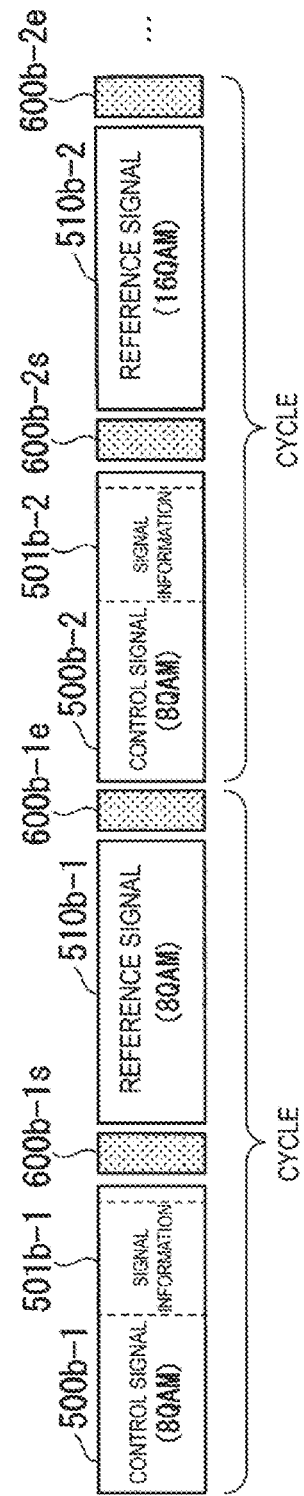
FIG. 14 is a diagram (part 2) illustrating the other format of the first transmission timing notification signal according to the same embodiment.

Further, in the second embodiment, the first transmission timing notification signal in the format illustrated in FIG. 13 or FIG. 14 may be applied instead of the first transmission timing notification signal in the format illustrated in FIG. 7. The first transmission timing notification signal illustrated in FIG. 13 has, for example, a format in which reference signals are bundled for each modulation scheme, reference signals 510a-1 to 510a-K are a set having a modulation scheme of "8 QAM" and the reference signals 510a-1 to 510a-K are signals having different baud rates and slot lengths. In addition, reference signals 511a-1 to 511a-L are a set having a modulation scheme of "16 QAM", and the reference signals 511a-1 to 511a-L are signals having different baud rates and slot lengths. Further, reference signals 512a-1 to 512a-M are a set having a modulation scheme of "64 QAM", and the reference signals 512a-1 to 512a-M are signals having different baud rates and slot lengths, K, L, and M are positive integers equal to or more than 2. In FIG. 13, the portion indicated by the solid line illustrates that the reference signal 510a-K and a guard time signal 601a-1 are continuous and the reference signal 511a-L and the guard time signal 602a-1 are continuous, and the portion of the dotted line indicates that the repetitive signals are inserted.

With the format as illustrated in FIG. 13, the reference signal detection unit 202 of the optical transmission and reception apparatus 20b which receives the first transmission timing notification signal in the format in FIG. 13 does not need to change a communication condition to be set to the DSP for each reference signal, and fixes a modulation scheme to 8 QAM, for example, in the reference signals 510a-1 to 510a-K and changes only a baud rate and a slot length to perform demodulation with reference to signal information 501a. Thus, it is possible to reduce a processing load on the reference signal detection unit 202. While the reference signals having the same modulation scheme are continuous, for example, in the reference signals 511a-1 to 511a-L, the modulation schemes are 16 QAM and the same. Thus, when a change of the baud rate by the reference signal detection unit 202 is terminated in a short time, signal lengths of guard time signals 601a-2 to 601a-L between the reference signals 511a-1 to 511a-L may be shortened or the guard time signals 601a-2 to 601a-L may be eliminated.

In the first transmission timing notification signal in the format in FIG. 13, a bundling unit is not limited to the modulation scheme, and may be a baud rate or may be a slot length. In other words, in a case of a first transmission timing notification signal in which reference signals are rearranged so that the reference signals having the same modulation scheme are continuous, the reference signals having the same baud rate are continuous, or the reference signals having the same slot length are continuous, any first transmission timing notification signal may be applied. In addition, in the first transmission timing notification signal in the format in FIG. 13, the reference signals 510a-1 to 510a-K, 511a-1 to 511a-L, 512a-1 to 512a-M, . . . may have the same fixed length.

The first transmission timing notification signal illustrated in FIG. 14 has a format in which one reference signal is associated with one control signal. As illustrated in FIG. 14, a reference signal 510-1 is associated with a control signal 500b-1, and guard time signals 600b-1s and 600b-1e are inserted before and after the reference signal 510b-1. In the format in FIG. 14, signal information 501b-1 does not include information of a slot length of the reference signal 510b-1, and only includes information of a modulation scheme when the reference signal 510b-1 is modulated, and information of a baud rate.

For example, a length of a cycle of the control signal 500b-1 is a length obtained by adding a length of the control signal 500b-1, a slot length of the reference signal 510b-1, and lengths of the guard time signals 600b-1s and 600b-1e. In the same manner, a length of a cycle of a control signal 500b-2 is a length obtained by adding a length of the control signal 500b-2, a slot length of the reference signal 510b-2, and lengths of guard time signals 600b-2s and 600b-2e.

With the format illustrated in FIG. 14, the reference signal detection unit 202 of the optical transmission and reception apparatus 20b which receives the first transmission timing notification signal in the format of FIG. 14 reads the reference signal 510b-1 included in a slot between the guard time signal 600b-1s following the control signal 500b-1 and the guard time signal 600b-1e. The reference signal detection unit 202 demodulates the read reference signal 510b-1 based on the modulation scheme and the baud rate written to the signal information 501b-1. With the format as illustrated in FIG. 14, the cycles at which the control signals 500b-1, 500b-2, . . . appear are shortened, so the signal is easily synchronized on the receiver side. In FIG. 14, the cycles at which the control signals 500b-1, 500b-2, . . . appear are cycles shorter than a cycle at which the control signal 500 appears in FIG. 7 or FIG. 13.

In the format in FIG. 14, lengths of the respective control signals 500b-1, 500b-2, . . . are the same length and lengths of the respective guard time signals 600b-1s, 600b-1e, 600b-2s, 600b-2e, . . . are the same. Thus, by setting the slot lengths of the reference signals 510b-1, 510b-2, . . . to be the same length, the cycles at which the control signals 500b-1, 500b-2, . . . appear can be set to a fixed length. In this manner, the control signals 500b-1, 500b-2, . . . appear at a constant cycle or the slot lengths of the reference signals 510b-1, 510b-2, . . . are the same length, so that the reference signal detection unit 202 can reduce a time required for detecting the reference signals 510b-1, 510b-2. Thus, it is possible to reduce a processing load on the reference signal detection unit 202.

Figure 15:
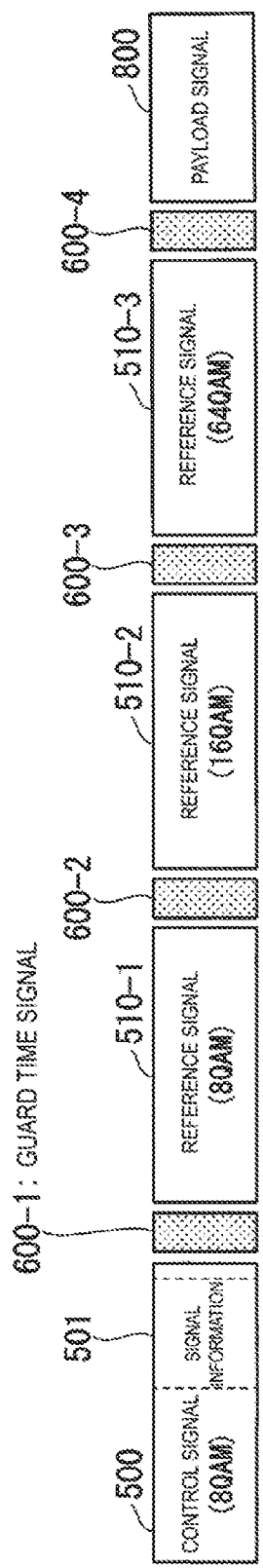
FIG. 15 is a diagram (part 3) illustrating the other format of the first transmission timing notification signal according to the same embodiment.

In the second embodiment described above, the first transmission timing signal is illustrated in FIG. 7, but the reference signal transmission unit 103 may transmit the first transmission timing signal including a payload signal 800 as illustrated in FIG. 15. The reference signal transmission unit 103 uses a specific bit string to generate the payload signal 800, and modulates the payload signal 800 in the common communication condition. Instead of the common communication condition, the modulation may be performed in a communication condition of any one of the reference signals 510-1, 510-2, and 510-3. As illustrated in the second embodiment above, there may be no payload signal 800, but the inclusion of the payload signal 800 has a control advantage in that a cycle at which the control signal 500 appears is the same cycle as in step S14, so that synchronization of signals or the like is easier on the receiver side.

Figure 16:
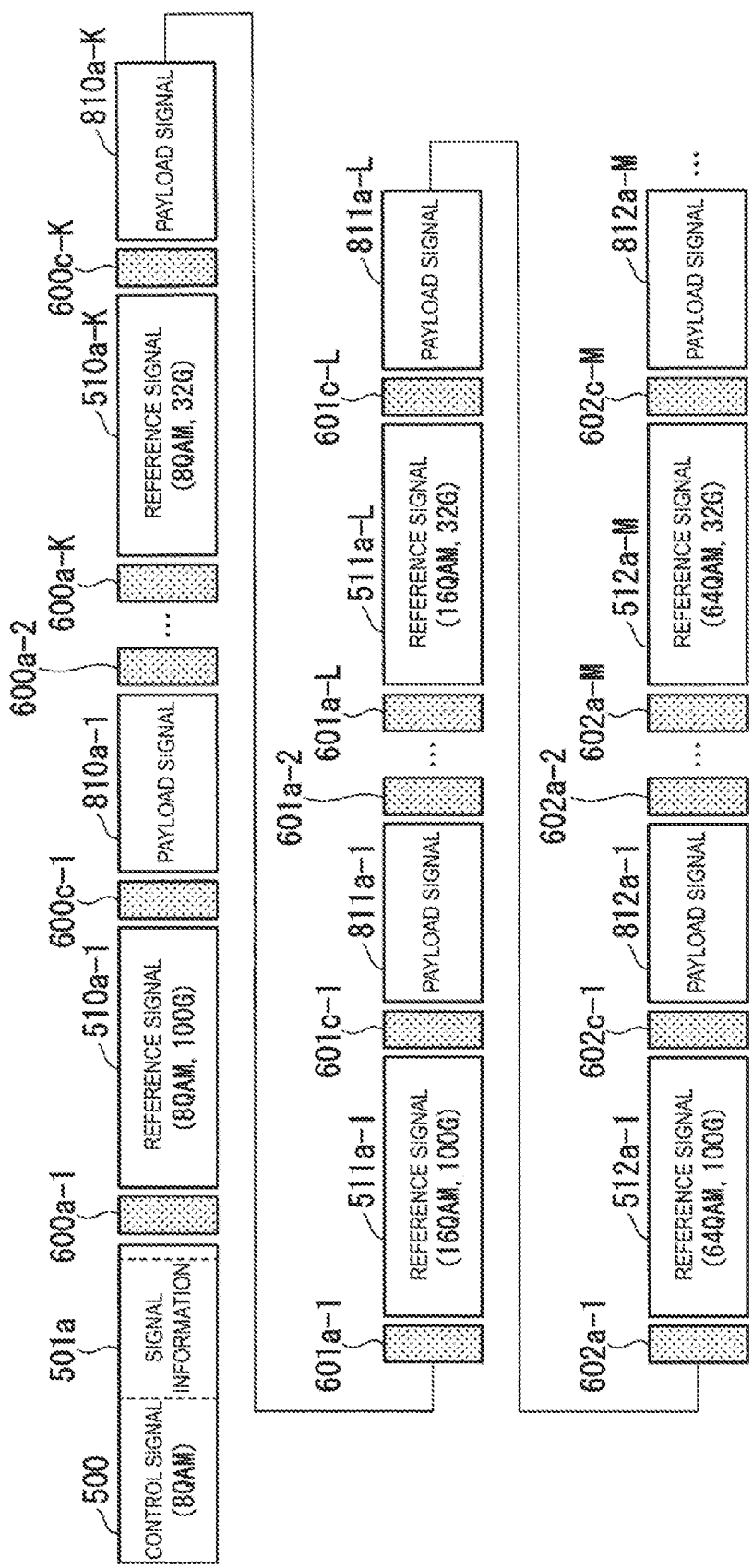
FIG. 16 is a diagram (part 4) illustrating the other format of the first transmission timing notification signal according to the same embodiment.

In the same manner as the configuration illustrated in FIG. 15, the format of the first transmission timing notification signal illustrated in FIG. 13 may also include payload signals 810a-1 to 810a-K, 811a-1 to 811a-L, and 812a-1 to 812a-M as illustrated in FIG. 16. In FIG. 16, the portion indicated by the solid line illustrates that the payload signal 810a-K and the guard time signal 601a-1 are continuous and the payload signal 811a-L and the guard time signal 602a-1 are continuous, and the portion of the dotted line indicates that the repetitive signals are inserted.

Figure 17:
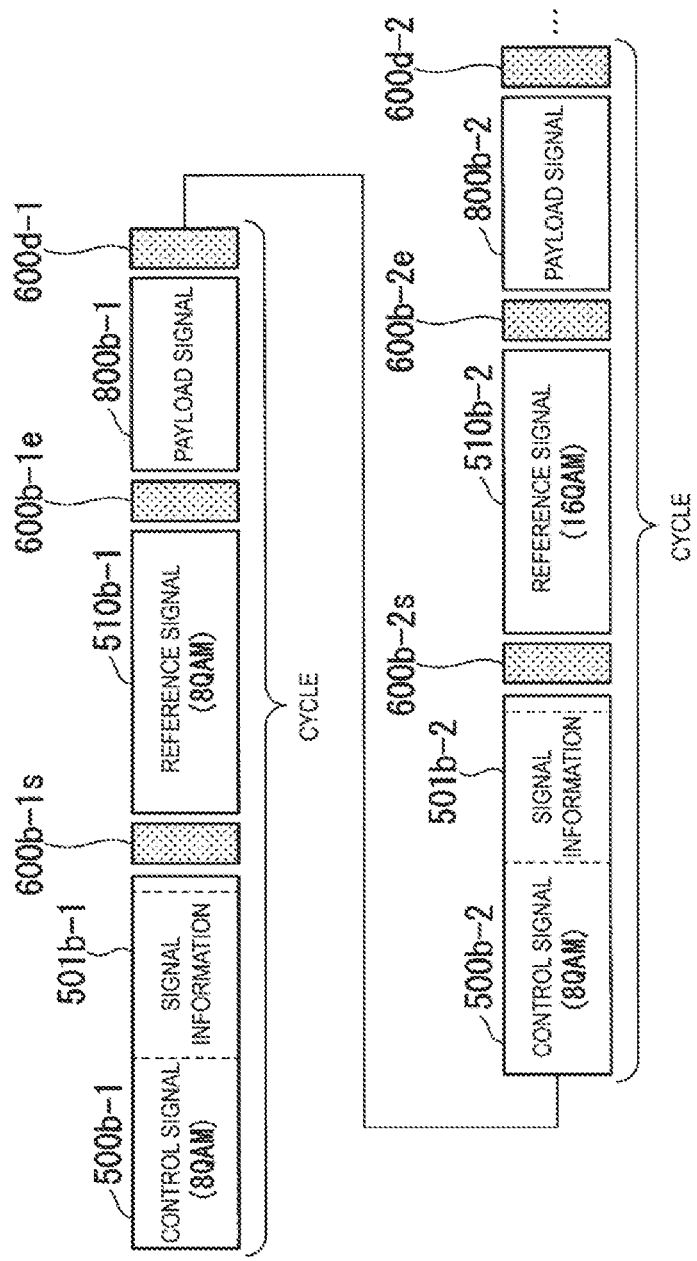
FIG. 17 is a diagram (part 5) illustrating the other format of the first transmission timing notification signal according to the same embodiment.

In the same manner as the configuration illustrated in FIG. 15, the format of the first transmission timing notification signal illustrated in FIG. 14 may also include payload signals 800b-1 and 800b-2 as illustrated in FIG. 17. In FIG. 17, the portion indicated by the solid line illustrates that the guard time signal 600d-1 and the control signal 500b-2 are continuous, and the portion of the dotted line indicates that the repetitive signals are inserted.

As illustrated in FIG. 18 to FIG. 22, also in the communication state in step S14, a reference signal may be transmitted in addition to the payload signal. For example, in a case where the optical transmission and reception apparatuses 20-1 to 2019-N are in the state in step S14 and perform transmission and reception of optical signals to and from the optical transmission and reception apparatus 10b, when the optical transmission and reception apparatus 20b is newly connected, by including the reference signal, the new optical transmission and reception apparatus 20b can be added to the optical transmission system 2 without interrupting or ending communication with the optical transmission and reception apparatuses 20b-1 to 20b-N.

Figure 18:
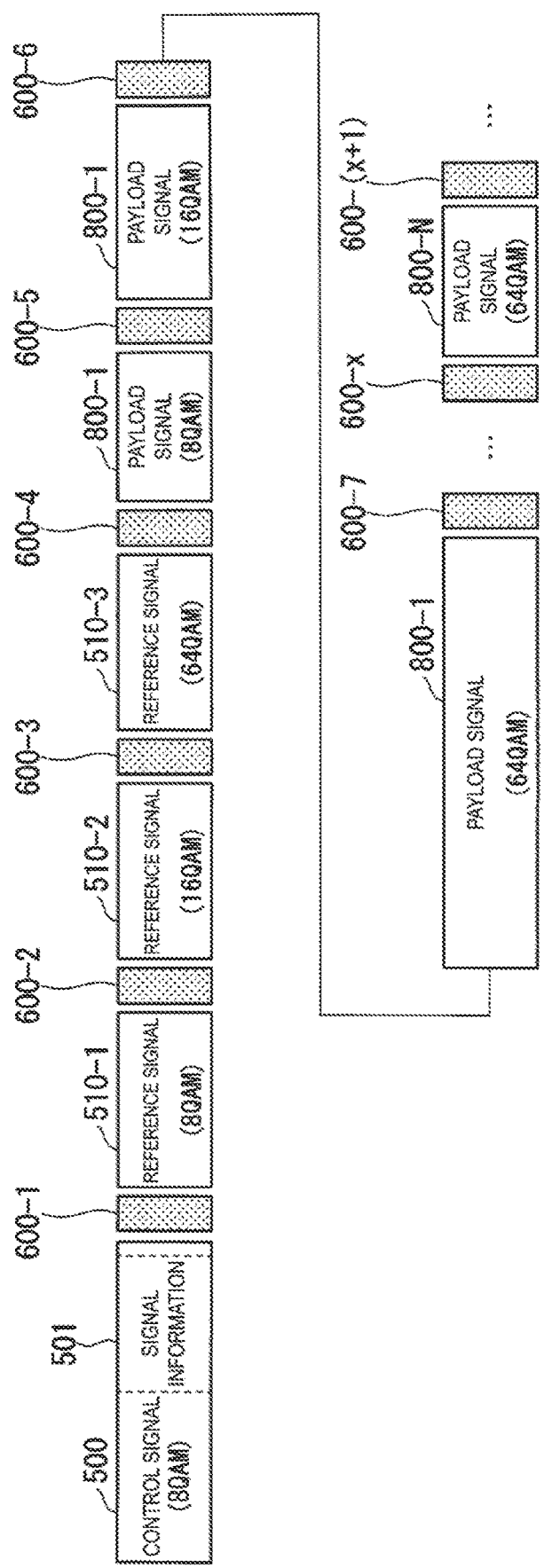
FIG. 18 is a diagram (part 1) illustrating a format when transmitting a reference signal in a communication state according to the same embodiment.

For example, the format illustrated in FIG. 18 is a format in which the reference signals 510-1 to 510-3 are inserted before payload signals 800-1 to 800-N having the optical transmission and reception apparatuses 20b-1 to 20b-N as transmission destinations. The payload signals 800-1 to 800-N is modulated in the communication conditions allocated to the optical transmission and reception apparatuses 20b-1 to 20b-N, and are inserted into timings and slots indicated by the transmission conditions. In FIG. 18, the signals to which branch numbers having the reference numeral 600 are allocated are guard time signals. In a case where there are a plurality of types of reference signals, the plurality of reference signals 510-1, 510-2, . . . may be inserted between the payload signals 800-1 to 800-N while being sandwiched by the guard time signals. In FIG. 18, the portion indicated by the solid line illustrates that the guard time signal 600-6 and the payload signal 800-1 are continuous, and the portion of the dotted line indicates that the repetitive signals are inserted.

Figure 19:
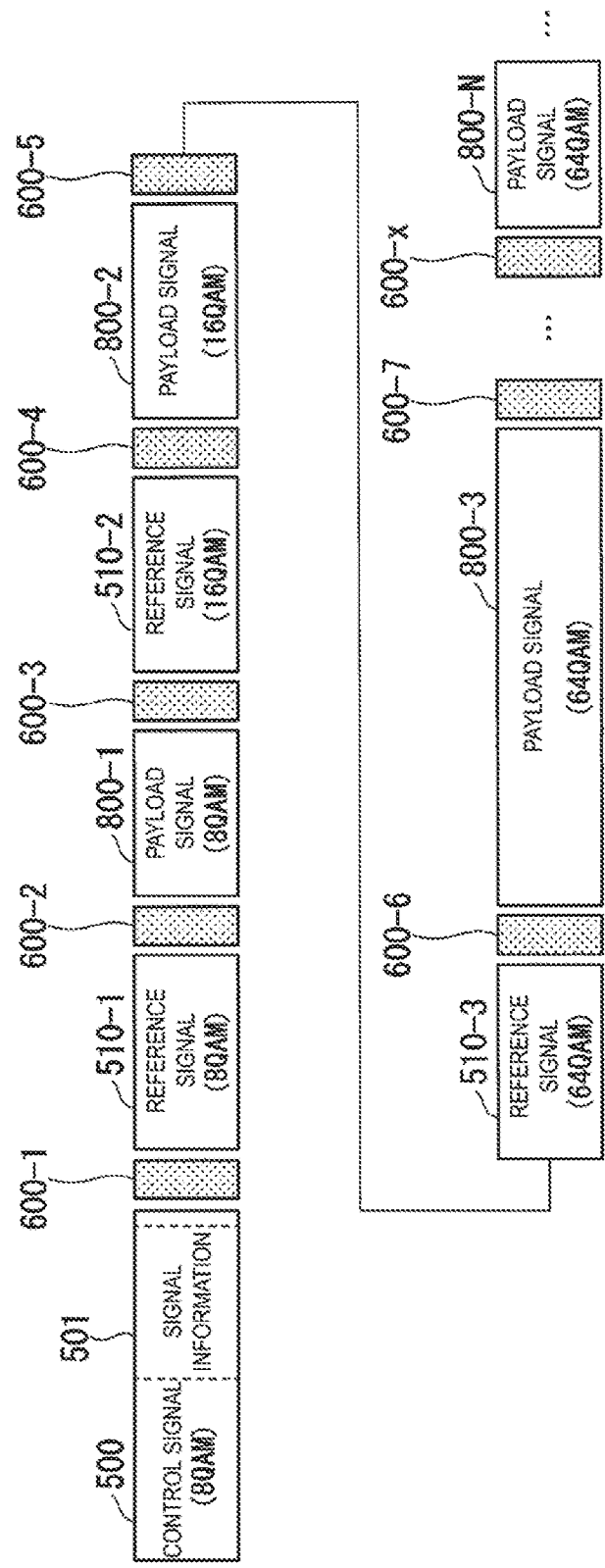
FIG. 19 is a diagram (part 2) illustrating the format for transmitting the reference signal in the communication state according to the same embodiment.

In addition, the format illustrated in FIG. 19 is a format in which the payload signals 800-1 to 800-N having the optical transmission and reception apparatuses 20b-1 to 20b-N as transmission destinations and the reference signals 510-1 to 510-3 are alternately inserted. In a case where there are a plurality of types of reference signals, the plurality of reference signals 510-1, 510-2, . . . may be inserted between the payload signals 800-1 to 800-N while being sandwiched by the guard time signals so that the reference signal and the payload signal are alternate. In FIG. 19, the portion indicated by the solid line illustrates that the guard time signal 600-5 and the reference signal 510-3 are continuous, and the portion of the dotted line indicates that the repetitive signals are inserted.

Figure 20:
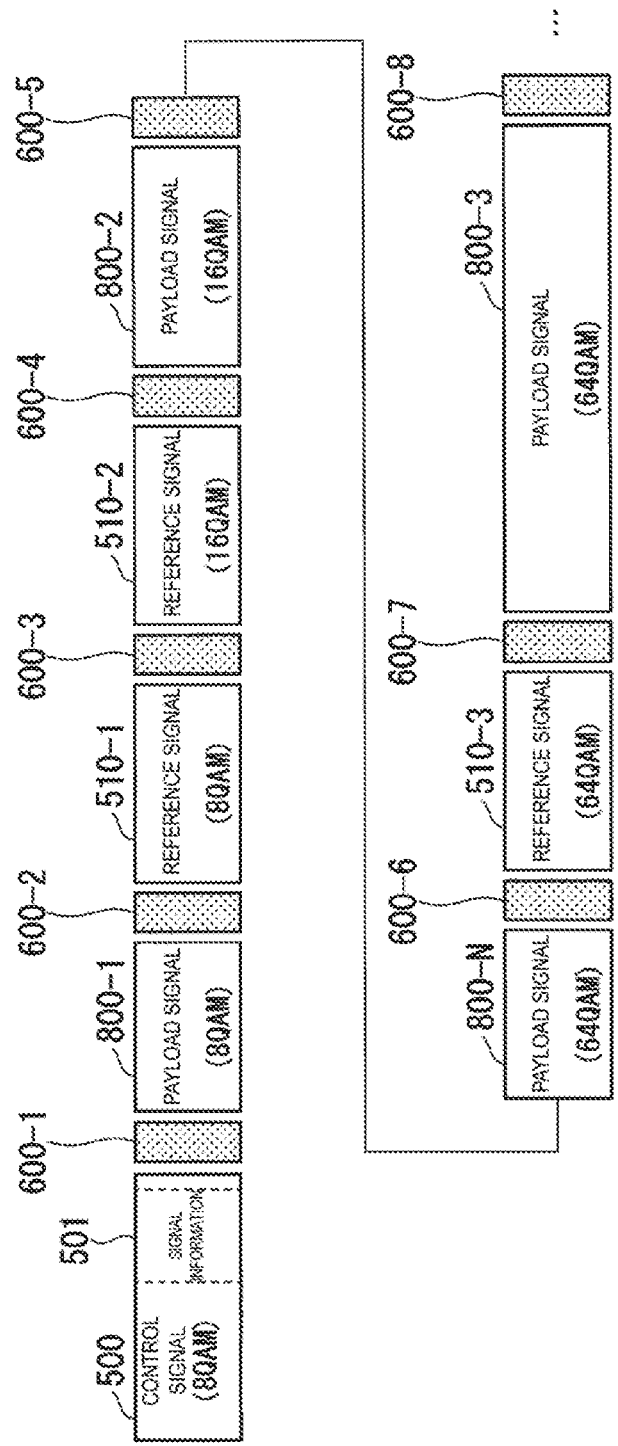
FIG. 20 is a diagram (part 3) illustrating the format for transmitting the reference signal in the communication state according to the same embodiment.

In addition, the format illustrated in FIG. 20 is a format in which the payload signals 800-1 to 800-N having the optical transmission and reception apparatuses 20b-1 to 20b-N as transmission destinations and the reference signals 510-1 to 510-3 are mixed in a random order. In a case where there are a plurality of types of reference signals, the plurality of reference signals 510-1, 510-2, . . . may be inserted in a random order between the payload signals 800-1 to 800-N while being sandwiched by the guard time signals. In FIG. 20, the portion indicated by the solid line illustrates that the guard time signal 600-5 and the payload signal 800-N are continuous, and the portion of the dotted line indicates that the repetitive signals are inserted.

Figure 21:
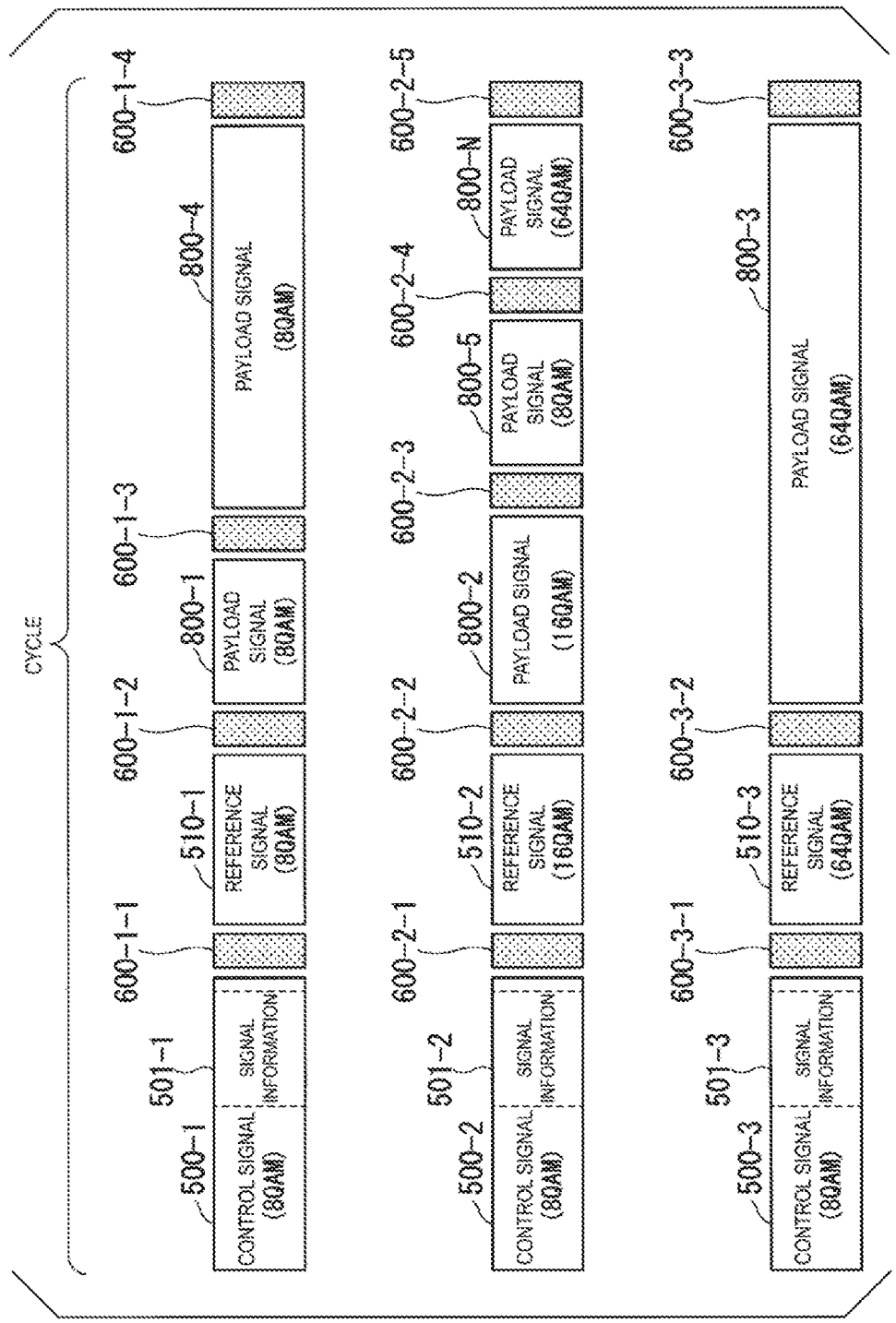
FIG. 21 is a diagram (part 4) illustrating the format for transmitting the reference signal in the communication state according to the same embodiment.

The format illustrated in FIG. 21 is a format in which during a cycle repeated at equal intervals by the control signals 500-1, 500-2, 500-3, . . . , after the reference signals 510-1 to 510-3 are arranged while being sandwiched by the guard time signals 600-1-1, 600-2-1, and 600-3-1 immediately after the control signals 500-1, 500-2, and 500-3 and the payload signals 800-1 to 800-N having the optical transmission and reception apparatuses 20b-1 to 20b-N as transmission destinations so that a length included in one cycle is the same length by including the guard time signals 600-1-1, . . . , 600-2-1, . . . , 600-3-1, . . . .

Figure 22:
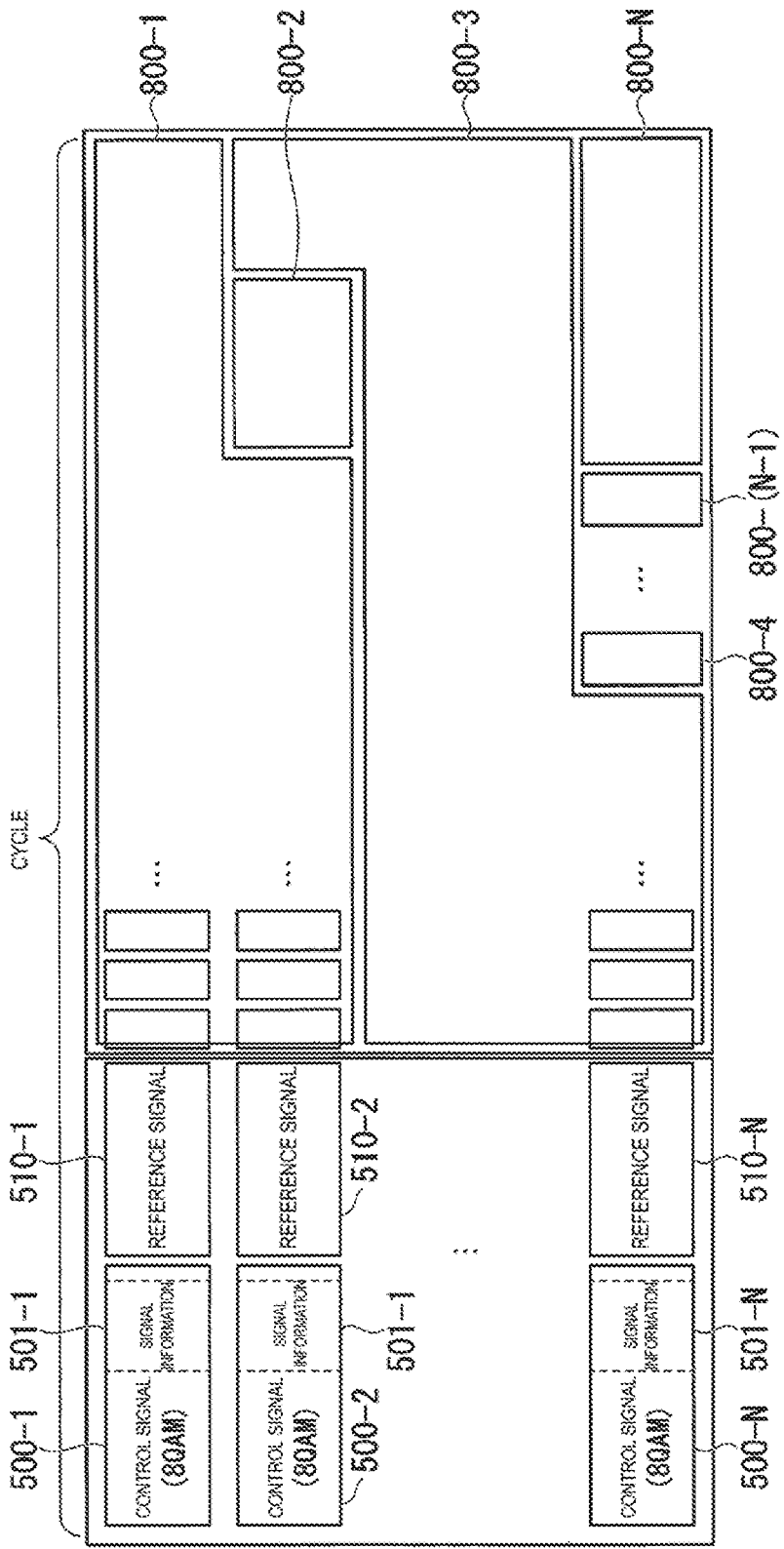
FIG. 22 is a diagram for supplementing contents of the format illustrated in FIG. 21.
Figure 23:
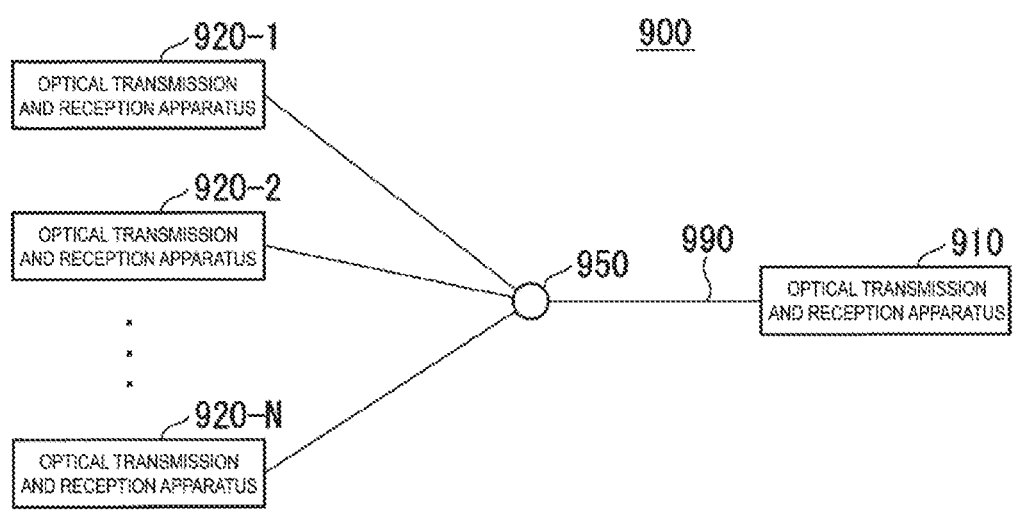
FIG. 23 is a block diagram illustrating a configuration of an optical transmission system which performs 1-to-N transmission and reception of optical signals.

The format illustrated in FIG. 21 may also be used as a multi-frame structure as illustrated in FIG. 22, and as illustrated in FIG. 22, for example, in a case where a size of the payload signal 800-3 having the optical transmission and reception apparatus 20b-3 as a transmission destination is large, it is possible to allocate the payload signal 800-3 within a plurality of cycles depending on the size.

In the first and second embodiments, any one of 8 QAM, 16 QAM, and 64 QAM is described as a modulation scheme, but the configuration of the present disclosure is not limited to the embodiment described above. Quadrature amplitude modulation other than 8, 16, and 64 may be applied, or another modulation scheme such as polarization multiplexing QSPK may be applied.

In the first and second embodiments described above, N, which is the number of the optical transmission and reception apparatuses 20-1 to 20-N and 20b-1 to 20b-N on the ground side, may be "1" as the minimum configuration, but in the case of N=1, since the configuration is a 1-to-1 configuration, the configuration may not be provided with the optical multiplexer-demultiplexer 40 and the optical passive elements 45-1 to 45-10.

The optical transmission and reception apparatuses 10, 10b, 20-1 to 20-N, 20b, and 20b-1 to 20b-N according to the above-described embodiment may be realized by a computer. In this case, a program for realizing the functions is recorded on a computer-readable recording medium, and the functions may be realized by reading the program recorded on the recording medium into a computer system and executing the program. The "computer system" here includes an OS or hardware such as a peripheral device. The "computer-readable recording medium" is, for example, a portable medium such as a flexible disk, a magneto-optical disk, a ROM, a CD-ROM or a storage device such as a hard disk embedded in the computer system. The "computer readable recording medium" may be a medium which dynamically holds programs for a short period, such as a communication line in a case of transmitting the program via a network such as the Internet or a communication line such as a telephone line or a medium which holds the program for a certain period, such as a volatile memory inside the computer system which becomes a server or a client in this case. The program may be for realizing some of the functions described above, may be a program which can realize the functions described above in combination with the program already recorded in the computer system, or may be realized by using a programmable logic device such as a Field Programmable Gate Array (FPGA).

The present embodiments are described above with reference to the drawings, but a specific configuration is not limited to the embodiments and may be implemented in various modes without departing from a gist thereof.

REFERENCE SIGNS LIST 1 optical transmission system
10 optical transmission and reception apparatus
11 transmission line condition detection unit
12 communication condition selection unit
13 communication condition setting unit
14 storage unit
20-1 to 20-N optical transmission and reception apparatus
40 optical multiplexer-demultiplexer
50 OpS apparatus

The invention claimed is:

1. An optical transmission system in which a plurality of optical transmission and reception apparatuses perform 1-to-N transmission and reception of optical signals, where N is an integer equal to or greater than 1, the optical transmission system being configured to select a communication condition that includes at least a modulation scheme or a baud rate and is a communication condition when each of the optical transmission and reception apparatuses performs transmission and reception in accordance with a transmission line condition, the transmission line condition being between any one first optical transmission and reception apparatus and each of second optical transmission and reception apparatuses, which are N grounds, other than the first optical transmission and reception apparatus,
wherein the first optical transmission and reception apparatus includes
a processor; and
a storage medium having computer program instructions stored thereon, when executed by the processor, perform to:
generate a plurality of reference signals corresponding to each of candidates of the communication condition by performing modulation based on each of the candidates of the communication condition enabling an own apparatus to perform transmission and reception,
transmit the plurality of reference signals and information of the communication conditions corresponding to the plurality of reference signals to each of the second optical transmission and reception apparatuses, and
select, based on information related to the reference signal successfully demodulated by each of the second optical transmission and reception apparatuses, the communication condition when transmission and reception with each of the second optical transmission and reception apparatuses is performed,
wherein the second optical transmission and reception apparatus includes
a processor; and
a storage medium having computer program instructions stored thereon, when executed by the processor, perform to:

receive the plurality of reference signals and the information of the communication conditions corresponding to the plurality of reference signals transmitted by the first optical transmission and reception apparatus, demodulate, based on the communication conditions corresponding to the plurality of reference signals, the plurality of reference signals received, and detect the reference signal successfully demodulated, and
transmit a registration request signal including information related to the reference signal to the first optical transmission and reception apparatus, and
the first optical transmission and reception apparatus and the second optical transmission and reception apparatus transmit and receive the optical signal in accordance with the communication condition selected by the communication condition selection unit.

2. The optical transmission system according to claim 1, comprising:
an optical passive element configured to branch an optical signal transmitted by the first optical transmission and reception apparatus and transmit the optical signals to each of the second optical transmission and reception apparatuses in a case where the first optical transmission and reception apparatus is on a transmission side, and configured to combine optical signals transmitted by the second optical transmission and reception apparatuses and transmit the optical signal to the first optical transmission and reception apparatus in a case where the first optical transmission and reception apparatus is on a reception side.

3. The optical transmission system according to claim 1, wherein the first optical transmission and reception apparatus includes
a processor; and
a storage medium having computer program instructions stored thereon, when executed by the processor, perform to:
detect the transmission line condition that is with each of the second optical transmission and reception apparatuses,
select any one of communication conditions associated with each of the transmission line conditions in advance based on the transmission line condition, and
set the communication condition of an own apparatus and the communication condition, of the second optical transmission and reception apparatus to the communication condition.

4. The optical transmission system according to claim 1, wherein in a case where the communication condition includes the modulation scheme and the baud rate,
when transmitting each of the plurality of reference signals, transmits the plurality of reference signals by rearranging the plurality of reference signals so that the reference signals having the same modulation scheme are continuous, the reference signals having the same baud rate are continuous, or the reference signals having a same length of the reference signal are continuous, or by adding a payload signal having a length in accordance with a length of each of the plurality of reference signals.

5. The optical transmission system according to claim 1, wherein when generating the plurality of reference signals,
the reference signals are generated so that each of the reference signals has the same length.

6. The optical transmission system according to claim 1, wherein a guard time signal having a signal length in accordance with a length of a time required to change the communication condition is inserted before and after each of the plurality of reference signals.

* * * * *